United States Patent
Kim

(10) Patent No.: US 11,423,696 B2
(45) Date of Patent: Aug. 23, 2022

(54) METHOD FOR RECOGNIZING FACE USING INTELLIGENT ELECTRONIC DEVICE

(71) Applicant: LG ELECTRONICS INC., Seoul (KR)

(72) Inventor: Sungil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 17/007,938

(22) Filed: Aug. 31, 2020

(65) Prior Publication Data
US 2021/0192186 A1    Jun. 24, 2021

(30) Foreign Application Priority Data
Dec. 18, 2019    (KR) .................. 10-2019-0169548

(51) Int. Cl.
*G06V 40/16*    (2022.01)
*G06N 3/04*    (2006.01)
*H04L 9/32*    (2006.01)

(52) U.S. Cl.
CPC .............. *G06V 40/171* (2022.01); *G06N 3/04* (2013.01); *G06V 40/165* (2022.01); *G06V 40/172* (2022.01); *G06V 40/178* (2022.01); *H04L 9/3231* (2013.01)

(58) Field of Classification Search
CPC ........ G06N 3/088; G06N 3/084; G06V 40/16; G06V 40/165; G06V 40/171; G06V 40/172; G06V 40/178; H04L 9/3231
See application file for complete search history.

(56) References Cited

U.S. PATENT DOCUMENTS

| | | | | |
|---|---|---|---|---|
| 5,781,650 A * | 7/1998 | Lobo | ............... | G06V 40/16 382/118 |
| 7,505,621 B1 * | 3/2009 | Agrawal | ............... | G06V 40/172 382/226 |
| 2014/0334734 A1 * | 11/2014 | Xiong | ............... | G06K 9/6255 382/159 |

* cited by examiner

*Primary Examiner* — Ruiping Li
(74) *Attorney, Agent, or Firm* — Birch, Stewart, Kolasch & Birch, LLP

(57) ABSTRACT

According to an embodiment, a method for recognizing a user's face using an intelligent electronic device comprises obtaining a face area from the user's face captured and obtaining face information from the face area, comparing the obtained face information with a default cluster, selecting whether to extract a face vector from the face information according to a result of the comparison, determining an age variation state for the user's face based on the extracted face vector, and upon determining that the face vector is in the age variation state for the user's face, extracting a face feature vector from the face vector and configuring an expanded cluster by adding the face feature vector to the default cluster. According to the disclosure, the intelligent electronic device may be related to artificial intelligence (AI) modules, unmanned aerial vehicles (UAVs), robots, augmented reality (AR) devices, virtual reality (VR) devices, and 5G service-related devices.

18 Claims, 16 Drawing Sheets

METHOD FOR RECOGNIZING FACE USING INTELLIGENT ELECTRONIC DEVICE

CROSS-REFERENCE TO RELATED APPLICATIONS

This application claims priority to Korean Patent Application No. 10-2019-0169548 filed in the Korean Intellectual Property Office on Dec. 18, 2019, the disclosure of which is incorporated by reference herein in its entirety.

TECHNICAL FIELD

The disclosure relates to face recognition methods using an intelligent electronic device and, more specifically, to face recognition methods using an intelligent electronic device, which are capable of precisely recognizing the face image of the same person regardless of changes in face over time.

DISCUSSION OF RELATED ART

Conventional face detection technology is not only used as a pre-step for face recognition but, as various applications, such as for human computer interfaces, video surveillance systems, and face-based image search recently emerge, their importance is gradually increasing. Despite much research on face detection technology, current algorithms fail to give reliability and detection speed satisfactory enough to apply in real life.

To address such issues, there is an ongoing research effort at methods of learning a decision boundary form a face sample pattern and using it in face detection. Representative methods are multilayer perception (MLP) and support vector machine (SVM).

Conventional MLP applies the local receptive field to the face image. Other conventional methods project the image pattern to multiple principle component analysis (PCA) subspaces and use distances for the subspaces as inputs of the MLP.

However, since MLP-based learning methods minimize only errors from given sample data, these methods work well on learned data but do not ensure successful operation on new data which has not yet learned. In particular, considering various changes in the face image due to factors such as lighting, facial expression, and pose, the MLP-based methods are less reliable unless a vast amount of sample data is provided.

In contrast, the SVM not only minimizes errors in given data, but also maximizes the margins of the entire system at the same time, so it has better generalization ability for new patterns than the MLP. Some conventional techniques have applied the SVM to the face image as it is, and has obtained some reliable face detection results, but it is not yet satisfactory to be applied in practice. Other conventional techniques do not use a face image as it is but they extract features through independent component analysis (ICA) and applies the SVM to somewhat improve the reliability of face detection. However, such conventional techniques generally use a nonlinear SVM in order to obtain reliable face detection performance, which has a problem in that the execution speed of the algorithm is slow due to a large amount of computation.

SUMMARY

The disclosure aims to address the foregoing issues and/or needs.

The disclosure aims to provide a face recognition method using an intelligent electronic device capable of precisely recognizing the face image of the same person regardless of changes in the face over time.

According to an embodiment, a method for recognizing a user's face using an intelligent electronic device comprises obtaining a face area from the user's face captured and obtaining face information from the face area, comparing the obtained face information with a default cluster, selecting whether to extract a face vector from the face information according to a result of the comparison, determining an age variation state for the user's face based on the extracted face vector, and upon determining that the face vector is in the age variation state for the user's face, extracting a face feature vector from the face vector and configuring an expanded cluster by adding the face feature vector to the default cluster.

The face information may include position information for the user's eye, nose, mouth, eyebrow, forehead, chin, and ear, ratio information for an interval of the user's eye, nose, mouth, eyebrow, forehead, chin, and ear, and shape information for the user's eye, nose, mouth, eyebrow, forehead, chin, and ear.

The default cluster may be configured based on a face feature extracted from position information for the user's eye, nose, mouth, eyebrow, forehead, chin, and ear, ratio information for an interval of the user's eye, nose, mouth, eyebrow, forehead, chin, and ear, and shape information for the user's eye, nose, mouth, eyebrow, forehead, chin, and ear.

Comparing the obtained face information with the default cluster may include recognizing or terminating the user's face when the face information is within the default cluster and extracting the face vector from the face information when the face information is out of the default cluster.

Determining the age variation state may include extracting feature values from the face vector, inputting the feature values to an artificial neural network (ANN) classifier to identify the age variation state, and determining the age variation state from the artificial neural network. The feature values may be values by the age variation state may be identified.

Configuring the expanded cluster may include generating a face image for interpolation based on the face feature vector.

Configuring the expanded cluster may include generating a mid cluster by predicting the age variation state for the user's face based on the default cluster and the expanded cluster.

The method may further comprise receiving, from a network, downlink control information (DCI) used for scheduling transmission of the obtained face information. The face information may be transmitted to the network based on the DCI.

The method may further comprise performing an initial access procedure with the network based on a synchronization signal block (SSB). The face information may be transmitted to the network via a physical uplink shared channel (PUSCH). Demodulation-reference signals (DM-RSs) of the SSB and the PUSCH may be quasi co-located (QCL) for QCL type D.

The method may further comprise controlling a transceiver to transmit the face information to an artificial intelligence (AI) processor included in the network and controlling the transceiver to receive AI-processed information from the AI processor. The A-processed information may include information resultant from determining the age variation state.

According to an embodiment, an intelligent electronic device comprises a camera and a processor receiving a user's face captured by the camera, wherein the processor obtains a face area from the user's face, obtains face information from the face area, compares the obtained face information with a preconfigured default cluster, and selects whether to extract a face vector from the face information according to a result of the comparison and determines an age variation state for the user's face based on the extracted face vector and, upon determining that the face vector is in the age variation state for the user's face, configures an expanded cluster by adding a face feature vector to the default cluster.

The face information may include position information for the user's eye, nose, mouth, eyebrow, forehead, chin, and ear, ratio information for an interval of the user's eye, nose, mouth, eyebrow, forehead, chin, and ear, and shape information for the user's eye, nose, mouth, eyebrow, forehead, chin, and ear.

The default cluster may be configured based on a face feature extracted from position information for the user's eye, nose, mouth, eyebrow, forehead, chin, and ear, ratio information for an interval of the user's eye, nose, mouth, eyebrow, forehead, chin, and ear and shape information for the user's eye, nose, mouth, eyebrow, forehead, chin, and ear.

The processor may recognize or terminate the user's face when the face information is within the default cluster and extract the face vector from the face information when the face information is out of the default cluster.

The processor may extract feature values from the face vector, input the feature values to an artificial neural network (ANN) classifier trained to identify the age variation state, and determine the age variation state from an output of an artificial neural network (ANN). The feature values may be values by the age variation state may be identified.

The processor may generate a face image for interpolation based on the face feature vector.

The processor may generate a mid cluster by predicting the age variation state for the user's face based on the default cluster and the expanded cluster.

The intelligent electronic device may further comprise a transceiver. The processor may receive, from a network via the transceiver, downlink control information (DCI) used for scheduling transmission of the obtained face information. The face information may be transmitted to the network via the transceiver based on the DCI.

The processor may perform an initial access procedure with the network based on a synchronization signal block (SSB) via the transceiver. The face information may be transmitted to the network via a physical uplink shared channel (PUSCH). Demodulation-reference signals (DM-RSs) of the SSB and the PUSCH may be quasi co-located (QCL) for QCL type D.

The processor may control the transceiver to transmit the face information to an artificial intelligence (AI) processor included in the network and control the transceiver to receive AI-processed information from the AI processor. The AI-processed information may include information resultant from determining the age variation state.

According to embodiments of the disclosure, a face recognition method using an intelligent electronic device provides the following effects.

According to the disclosure, it is possible to precisely recognize the face image of the same person regardless of changes in the face over time.

According to the disclosure, the user's face or face image which is varied depending on the user's age may be classified as the same cluster, thereby enhancing the face recognition rate.

Effects of the present disclosure are not limited to the foregoing, and other unmentioned effects would be apparent to one of ordinary skill in the art from the following description.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DESCRIPTION OF EXEMPLARY EMBODIMENTS

Figure 1:
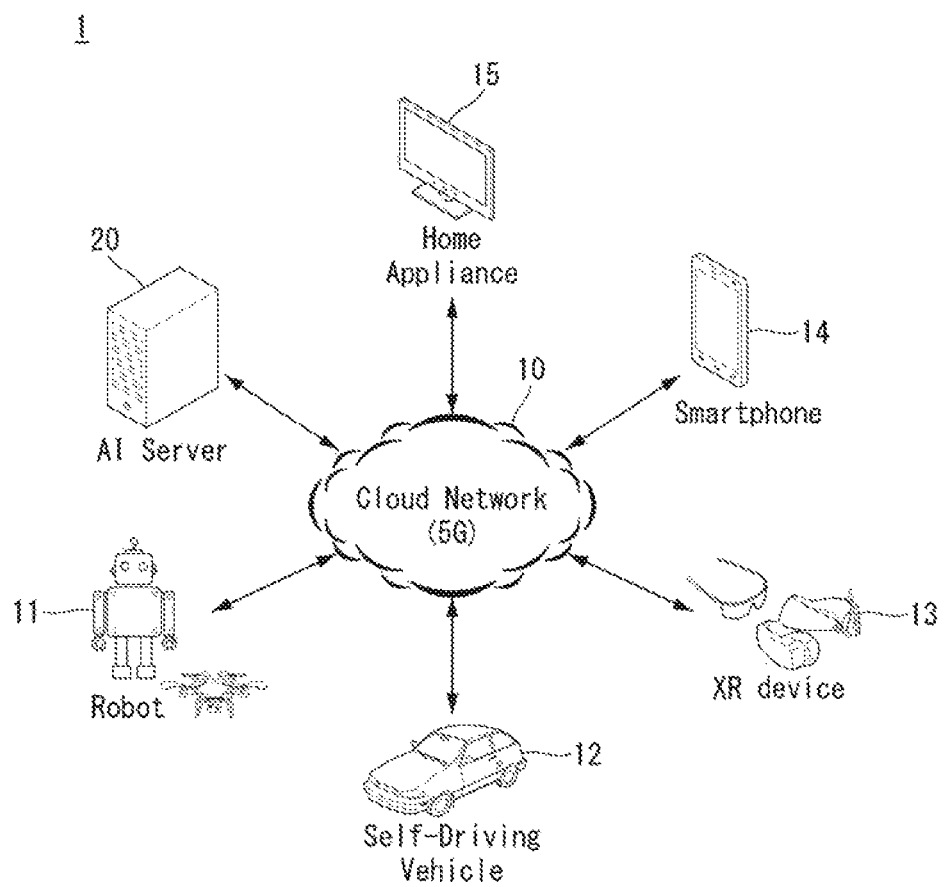
FIG. 1 is a conceptual diagram illustrating an embodiment of an AI device.

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

Three major requirement areas of 5G include (1) an enhanced mobile broadband (eMBB) area, (2) a massive machine type communication (mMTC) area, and (3) ultra-reliable and low latency communications (URLLC) area.

Some use cases may require multiple areas for optimization, and other use cases may be focused to only one key performance indicator (KPI). 5G supports these various use cases in a flexible and reliable manner.

The EMBB enables far beyond basic mobile Internet access and covers media and entertainment applications in rich interactive work, cloud or augmented reality. Data is one of key dynamic power of 5G and in a 5G era, a dedicated voice service may not be seen for the first time. In 5G, a voice is expected to be treated as an application program using data connection simply provided by a communication system. Main reasons for an increased traffic volume are increase in content size and increase in the number of applications requiring a high data transmission rate. Streaming services (audio and video), interactive video, and mobile Internet connections will be used more widely as more devices connect to Internet. These many application programs require always-on connectivity in order to push real-time information and notifications to a user. Cloud storage and applications are growing rapidly in mobile communication platforms, which may be applied to both work and entertainment. Cloud storage is a special use case that drives growth of uplink data transmission rates. 5G is also used for remote tasks in cloud and requires much lower end-to-end delays so as to maintain excellent user experience when tactile interfaces are used. Entertainment, for example, cloud gaming and video streaming is another key factor in increasing the need for mobile broadband capabilities. Entertainment is essential in smartphones and tablets at anywhere including in high mobility environments such as trains, cars and airplanes. Another use case is augmented reality and information search for entertainment. Here, augmented reality requires very low latency and instantaneous amount of data.

Further, one of most anticipated 5G use cases relates to a function, i.e., mMTC that can smoothly connect embedded sensors in all fields. By 2020 year, potential IoT devices are expected to reach 20.4 billion. Industrial IoT is one of areas in which 5G plays a major role in enabling smart cities, asset tracking, smart utilities, and agriculture and security infrastructure.

URLLC includes new services to transform an industry through ultra-reliable/available low latency links, such as remote control of major infrastructure and self-driving vehicles. A level of reliability and latency is essential for smart grid control, industrial automation, robotics, drone control, and coordination.

Hereinafter, a number of use cases are described in more detail.

5G may complement fiber-to-the-home (FTTH) and cable-based broadband (or DOCSIS) as a means of providing streams that are rated at hundreds of megabits per second to gigabits per second. Such a high speed is required to deliver televisions with a resolution of 4K or more (6K, 8K, and more) as well as virtual reality and augmented reality. Virtual Reality (VR) and Augmented Reality (AR) applications include nearly immersive sporting events. A specific application program may require a special network setting. For example, for VR games, in order to minimize latency, game companies may need to integrate core servers with an edge network server of a network operator.

An automotive is expected to become important new dynamic power for 5G together with many use cases for mobile communication to vehicles. For example, entertainment for passengers requires simultaneous high capacity and high mobility mobile broadband. This is because future users continue to expect high quality connections regardless of a position and speed thereof. Another use case of an automotive sector is an augmented reality dashboard. This identifies objects in the dark above what a driver views through a front window and overlays and displays information that notifies the driver about a distance and movement of the object. In the future, wireless modules enable communication between vehicles, exchange of information between a vehicle and a supporting infrastructure, and exchange of information between a vehicle and other connected devices (e.g., devices carried by pedestrians). A safety system guides alternative courses of an action to enable drivers to safer drive, thereby reducing the risk of an accident. The next step will be a remotely controlled or self-driven vehicle. This requires very reliable and very fast communication between different self-driving vehicles and between automobiles and infrastructure. In the future, self-driving vehicles will perform all driving activities and the driver will focus on traffic anomalies that the vehicle itself cannot identify. The technical requirements of self-driving vehicles require ultra-low latency and ultra-fast reliability so as to increase traffic safety to an unachievable level.

Smart cities and smart homes, referred to as smart societies, will be embedded in a high density wireless sensor network. A distributed network of intelligent sensors will identify conditions for a cost and energy-efficient maintenance of a city or a home. Similar settings may be made for each family. Temperature sensors, window and heating controllers, burglar alarms and home appliances are all connected wirelessly. These many sensors are typically low data rates, low power and low cost. However, for example, real-time HD video may be required in a specific type of device for surveillance.

Consumption and distribution of energy including a heat or a gas is highly decentralized, thereby requiring automated control of distributed sensor networks. Smart grids interconnect these sensors using digital information and communication technology so as to collect information and act accordingly. The information may include a behavior of suppliers and consumers, allowing smart grids to improve distribution of fuels such as electricity in efficiency, reliability, economics, sustainability of production, and in an automated manner. Smart grid may be viewed as another sensor network with low latency.

A health sector has many application programs that can benefit from mobile communication. The communication system may support telemedicine that provides clinical care at a far distance. This may help reduce barriers to distance and improve access to healthcare services that are not consistently available in remote rural areas. It is also used for saving lives in important care and emergency situations. A mobile communication based wireless sensor network may provide remote monitoring and sensors for parameters such as a heart rate and a blood pressure.

Wireless and mobile communication is becoming gradually important in an industrial application field. A wiring requires a highly installing and maintaining cost. Therefore, the possibility of replacing with a wireless link that can reconfigure a cable is an attractive opportunity in many industry fields. However, achieving this requires that a wireless connection operates with reliability, capacity, and delay similar to a cable and that management is simplified. Low latency and very low error probability are new requirements that need to be connected in 5G.

Logistics and freight tracking are important use cases for mobile communication that enable tracking of inventory and packages at anywhere using a position-based information system. A use case of logistics and freight tracking typically requires a low data rate, but requires reliable position information and a wide range.

The present disclosure to be described later in the present disclosure may be implemented by combining or changing each embodiment so as to satisfy the requirements of the above-described 5G.

FIG. 1 is a conceptual diagram illustrating an embodiment of an AI device.

Referring to FIG. 1, in an AI system, at least one of an AI server 20, a robot 11, an autonomous vehicle 12, an XR device 13, a smartphone 14, or a home appliance 15 is connected to a cloud network 10. Here, the robot 11, the autonomous vehicle 12, the XR device 13, the smartphone 14, or the home appliance 15 to which AI technology is applied may be referred to as AI devices 11 to 15.

The cloud network 10 may mean a network that configures part of a cloud computing infrastructure or that exists inside a cloud computing infrastructure. Here, the cloud network 10 may be configured using a 3G network, a 4G network, a long term evolution (LTE) network, or a 5G network.

That is, each device 11 to 15 and 20 constituting the AI system may be connected to each other through the cloud network 10. In particular, each of the devices 11 to 15 and 20 may communicate with each other through a base station, but may directly communicate with each other without passing through a base station.

The AI server 20 may include a server that performs AI processing and a server that performs operations on big data.

The AI server 20 may be connected to at least one of the robot 11, the autonomous vehicle 12, the XR device 13, the smartphone 14, or the home appliance 15, which are AI devices constituting the AI system through the cloud network 10 and may help at least some of AI processing of the connected AI devices 11 to 15.

In this case, the AI server 20 may learn an artificial neural network according to machine learning algorithm instead of the AI devices 11 to 15 and directly store a learning model or transmit a learning model to the AI devices 11 to 15.

In this case, the AI server 20 may receive input data from the AI devices 11 to 15, infer a result value of the input data received using a learning model, and generate a response or a control command based on the inferred result value to transmit the response or the control command to the AI devices 11 and 15.

Alternatively, the AI devices 11 to 15 may directly infer a result value of the input data using a learning model and generate a response or a control command based on the inferred result value.

<AI+Robot>

AI technology is applied to the robot 11, and the robot 11 may be implemented into a guide robot, a transport robot, a cleaning robot, a wearable robot, an entertainment robot, a pet robot, an unmanned aerial robot, or the like.

The robot 11 may include a robot control module for controlling an operation, and the robot control module may mean a software module or a chip implemented in hardware.

The robot 11 may obtain status information of the robot 11 using sensor information obtained from various kinds of sensors, detect (recognize) a surrounding environment and an object, generate map data, determine a moving route and a driving plan, determine a response to a user interaction, or determine an operation.

Here, in order to determine a movement route and a driving plan, the robot 11 may use sensor information obtained from a sensor of at least one of rider, radar, and a camera.

The robot 11 may perform the above operation using a learning model configured with at least of one artificial neural network. For example, the robot 11 may recognize a surrounding environment and an object using a learning model, and determine an operation using the recognized surrounding environment information or object information. Here, the learning model may be directly learned by the robot 11 or may be learned by an external device such as the AI server 20.

In this case, by generating a result directly using a learning model, the robot 11 may perform an operation, but may transmit sensor information to an external device such as the AI server 20 and receive the generated result and perform an operation.

The robot 1 may determine a movement route and a driving plan using at least one of map data, object information detected from sensor information, or object information obtained from an external device, and control a driver to drive the robot 11 according to the determined movement route and driving plan.

The map data may include object identification information about various objects disposed in a space in which the robot 11 moves. For example, the map data may include object identification information about fixed objects such as walls and doors and movable objects such as flower pots and desks. The object identification information may include a name, a kind, a distance, and a position.

Further, by controlling the driver based on the control/interaction of a user, the robot 11 may perform an operation or may drive. In this case, the robot 11 may obtain intention information of an interaction according to the users motion or voice utterance, and determine a response based on the obtained intention information to perform an operation.

<AI+Autonomous Vehicle>

AI technology is applied to the autonomous vehicle 12 and thus the autonomous vehicle 12 may be implemented into a mobile robot, a vehicle, an unmanned aerial vehicle, or the like.

The autonomous vehicle 12 may include an autonomous driving control module for controlling an autonomous driving function, and the autonomous driving control module may mean a software module or a chip implemented in hardware. The autonomous driving control module may be included inside the autonomous vehicle 12 as a configuration of the autonomous vehicle 12, but may be configured as a separate hardware to be connected to the outside of the autonomous vehicle 12.

The autonomous vehicle 12 may obtain status information thereof using sensor information obtained from various types of sensors, detect (recognize) a surrounding environment and object, generate map data, determine a moving route and a driving plan, or determine an operation.

Here, in order to determine a movement route and a driving plan, the autonomous vehicle 12 may use sensor information obtained from a sensor of at least one of rider, radar, and a camera, similar to the robot 11.

In particular, the autonomous vehicle 12 may recognize an environment or an object about an area in which a field of view is covered or an area of a predetermined distance or more by receiving sensor information from external devices or may directly receive recognized information from external devices.

The autonomous vehicle 12 may perform the above-described operations using a learning model configured with at least one artificial neural network. For example, the autonomous vehicle 12 may recognize a surrounding environment and an object using a learning model, and determine a driving route using the recognized surrounding environment information or object information. Here, the learning model may be learned directly from the autonomous vehicle 12 or may be learned from an external device such as the AI server 20.

In this case, by generating a result directly using a learning model, the autonomous vehicle 12 may perform an operation, but transmit sensor information to an external device such as the AI server 20 and thus receive the generated result to perform an operation.

The autonomous vehicle 12 may determine a moving route and a driving plan using at least one of map data, object information detected from sensor information, or object information obtained from an external device, and controls the driver to drive the autonomous vehicle 12 according to the determined moving route and driving plan.

The map data may include object identification information about various objects disposed in a space (e.g., road) in which the autonomous vehicle 12 drives. For example, the map data may include object identification information about fixed objects such as street lights, rocks, buildings, and movable objects such as vehicles and pedestrians. The object identification information may include a name, a kind, a distance, a position, and the like.

Further, by controlling the driver based on a user's control/interaction, the autonomous vehicle 12 may perform an operation or may drive. In this case, the autonomous vehicle 12 may obtain intention information of an interaction according to the user's motion or voice utterance, and determine a response based on the obtained intention information to perform an operation.

<AI+XR>

AI technology is applied to the XR device 13 and thus the XR device 13 may be implemented into a head-mount display (HMD), a head-up display (HUD) installed in a vehicle, a television, a mobile phone, a smartphone, a computer, a wearable device, a home appliance, digital signage, a vehicle, a fixed robot, or a mobile robot.

The XR device 13 may analyze three-dimensional point cloud data or image data obtained through various sensors or from an external device to generate position data and attribute data of the three-dimensional points, thereby obtaining information about a surrounding space or a reality object and rendering and outputting an XR object to output. For example, the XR device 13 may output an XR object including additional information about the recognized object to correspond to the recognized object.

The XR device 13 may perform the above-described operations using a learning model configured with at least one artificial neural network. For example, the XR device 13 may recognize a real object in 3D point cloud data or image data using the learning model, and provide information corresponding to the recognized real object. Here, the learning model may be learned directly from the XR device 13 or may be learned from an external device such as the AI server 20.

In this case, by generating a result directly using a learning model, the XR device 13 may perform an operation, but transmit sensor information to an external device such as the AI server 20 and receive the generated result to perform an operation.

<AI+Robot+Autonomous Driving>

AI technology and autonomous driving technology are applied to the robot 11 and thus the robot 11 may be implemented into a guide robot, a transport robot, a cleaning robot, a wearable robot, an entertainment robot, a pet robot, an unmanned aerial robot, or the like.

The robot 11 to which AI technology and autonomous driving technology are applied may mean a robot having an autonomous driving function or a robot 11 interacting with the autonomous vehicle 12.

The robot 11 having an autonomous driving function may be collectively referred to as devices that moves by themselves according to a given moving route without a user's control or that determine and move a moving route by themselves.

In order to determine at least one of a movement route or a driving plan, the robot 11 and the autonomous vehicle 12 having an autonomous driving function may use a common sensing method. For example, the robot 11 and the autonomous vehicle 12 having the autonomous driving function may determine at least one of a movement route or a driving plan using information sensed through lidar, radar, and the camera.

While the robot 11 interacting with the autonomous vehicle 12 exists separately from the autonomous vehicle 12, the robot 11 may be linked to an autonomous driving function inside or outside the autonomous vehicle 12 or may perform an operation connected to a user who rides in the autonomous vehicle 12.

In this case, the robot 11 interacting with the autonomous vehicle 12 may obtain sensor information instead of the autonomous vehicle 12 to provide the sensor information to the autonomous vehicle 12 or may obtain sensor information and generate surrounding environment information or object information to provide the surrounding environment information or the object information to the autonomous vehicle 12, thereby controlling or assisting an autonomous driving function of the autonomous vehicle 12.

Alternatively, the robot 11 interacting with the autonomous vehicle 12 may monitor a user who rides in the autonomous vehicle 12 or may control a function of the autonomous vehicle 12 through an interaction with the user. For example, when it is determined that a driver is in a drowsy state, the robot 11 may activate an autonomous driving function of the autonomous vehicle 12 or assist the control of the driver of the autonomous vehicle 12. Here, the function of the autonomous vehicle 12 controlled by the robot 11 may include a function provided by a navigation system or an audio system provided inside the autonomous vehicle 12 as well as an autonomous driving function.

Alternatively, the robot 11 interacting with the autonomous vehicle 12 may provide information from the outside of the autonomous vehicle 12 to the autonomous vehicle 12 or assist a function of the autonomous vehicle 12. For example, the robot 11 may provide traffic information including signal information to the autonomous vehicle 12 as in a smart traffic light and interact with the autonomous vehicle 12 to automatically connect an electric charger to a charging port, as in an automatic electric charger of an electric vehicle.

<AI+Robot+XR>

AI technology and XR technology are applied to the robot 11, and the robot 11 may be implemented into a guide robot, a transport robot, a cleaning robot, a wearable robot, an entertainment robot, a pet robot, an unmanned aerial robot, a drone, or the like.

The robot 11 to which the XR technology is applied may mean a robot to be an object of control/interaction in an XR image. In this case, the robot 11 may be distinguished from the XR device 13 and be interworked with the XR device 13.

When the robot 11 to be an object of control/interaction in the XR image obtains sensor information from sensors including a camera, the robot 11 or the XR device 13 generates an XR image based on the sensor information, and the XR device 13 may output the generated XR image. The robot 11 may operate based on a control signal input through the XR device 13 or a user interaction.

For example, the user may check an XR image corresponding to a viewpoint of the robot 11 remotely linked through an external device such as the XR device 13, and adjust an autonomous driving route of the robot 11 through an interaction, control an operation or driving of the robot 11, or check information of a surrounding object.

<AI+Autonomous Vehicle+XR>

AI technology and XR technology are applied to the autonomous vehicle 12, and the autonomous vehicle 12 may be implemented into a mobile robot, a vehicle, an unmanned aerial vehicle, and the like.

The autonomous vehicle 12 to which XR technology is applied may mean an autonomous vehicle having a means for providing an XR image or an autonomous vehicle to be an object of control/interaction in the XR image. In particular, the autonomous vehicle 12 to be an object of control/interaction in the XR image may be distinguished from the XR device 13 and be interworked with the XR device 13.

The autonomous vehicle 12 having a means for providing an XR image may obtain sensor information from sensors including a camera, and output an XR image generated based on the obtained sensor information. For example, by having an HUD and outputting an XR image, the autonomous vehicle 12 may provide an XR object corresponding to a real object or an object on a screen to an occupant.

In this case, when the XR object is output to the HUD, at least a part of the XR object may be output to overlap with the actual object to which the occupant's eyes are directed. However, when the XR object is output to the display provided inside the autonomous vehicle 12, at least a part of the XR object may be output to overlap with an object on the screen. For example, the autonomous vehicle 12 may output XR objects corresponding to objects such as a road, another vehicle, a traffic light, a traffic sign, a motorcycle, a pedestrian, a building, and the like.

When the autonomous vehicle 12 to be an object of control/interaction in the XR image obtains sensor information from sensors including a camera, the autonomous vehicle 12 or the XR device 13 may generate an XR image based on the sensor information, and the XR device 13 may output the generated XR image. The autonomous vehicle 12 may operate based on a user's interaction or a control signal input through an external device such as the XR device 13.

[EXtended Reality (XR) Technology]

EXtended Reality (XR) collectively refers to Virtual Reality (VR), Augmented Reality (AR), and Mixed Reality (MR). VR technology is computer graphic technology that provides an object or a background of a real world only to CG images, AR technology is computer graphic technology that together provides virtual CG images on real object images, and MR technology is computer graphic technology that provides by mixing and combining virtual objects in a real world.

MR technology is similar to AR technology in that it shows both a real object and a virtual object. However, there is a difference in that in AR technology, a virtual object is used in the form of supplementing a real object, but in MR technology, a virtual object and a real object are used in an equivalent nature.

XR technology may be applied to a Head-Mount Display (HMD), a Head-Up Display (HUD), a mobile phone, a tablet PC, a laptop computer, a desktop computer, a television, digital signage, etc. and a device to which XR technology is applied may be referred to an XR device.

A. Example of Block Diagram of UE and 5G Network

Figure 2:
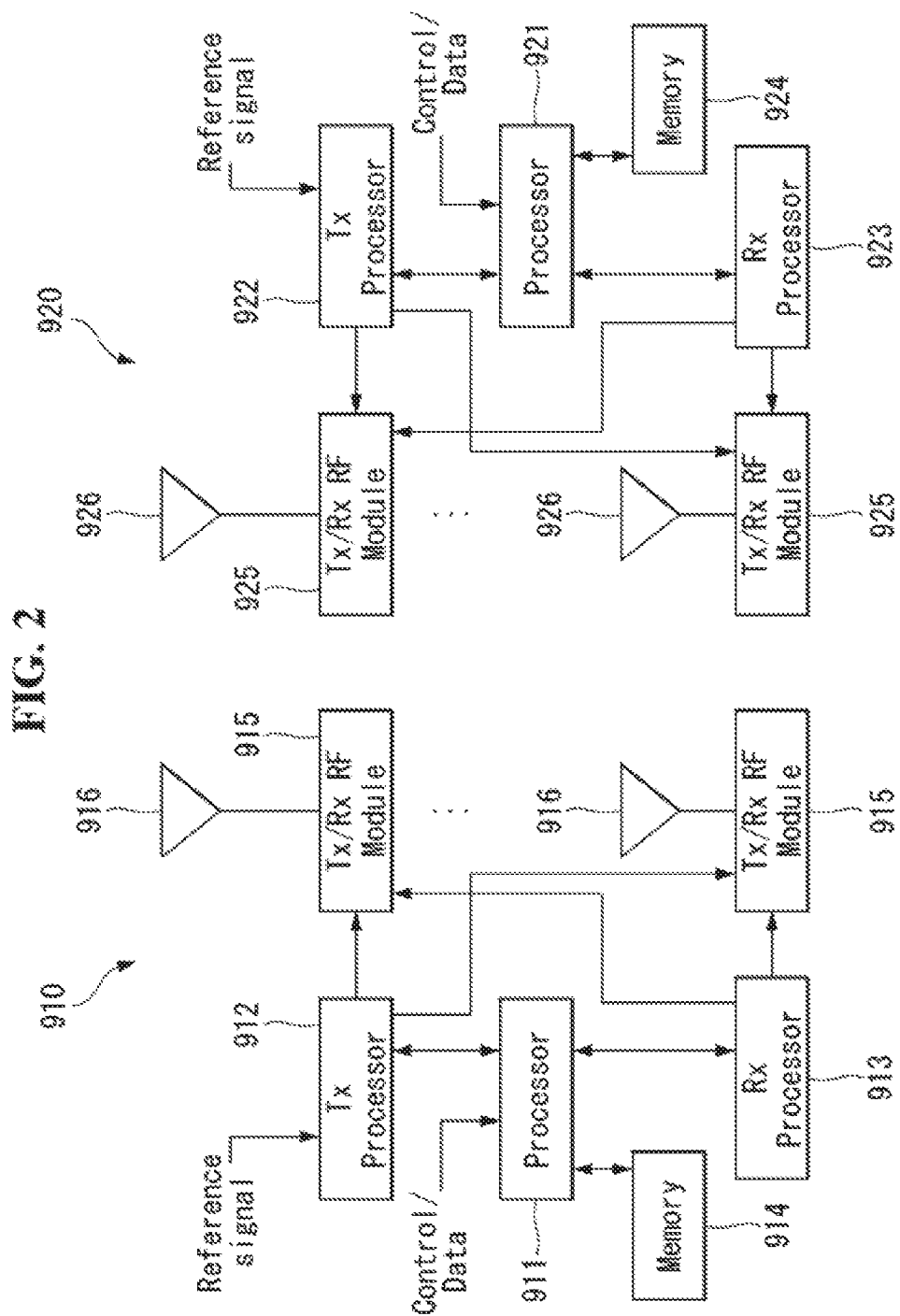
FIG. 2 is a block diagram illustrating a wireless communication system that can be applied to methods proposed in the present disclosure.

FIG. 2 is a block diagram of a wireless communication system to which methods proposed in the disclosure are applicable.

Referring to FIG. 2, a device (AI device) including an AI module is defined as a first communication device (910), and a processor 911 can perform detailed autonomous operations.

A 5G network including another device (AI server) communicating with the AI device is defined as a second communication device (920), and a processor 921 can perform detailed autonomous operations.

The 5G network may be represented as the first communication device and the AI device may be represented as the second communication device.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 2, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

According to an embodiment of the present disclosure, the first communication device may be an intelligent electronic device, and the second communication device may be a 5G network.

B. Signal Transmission/Reception Method in Wireless Communication System

Figure 3:
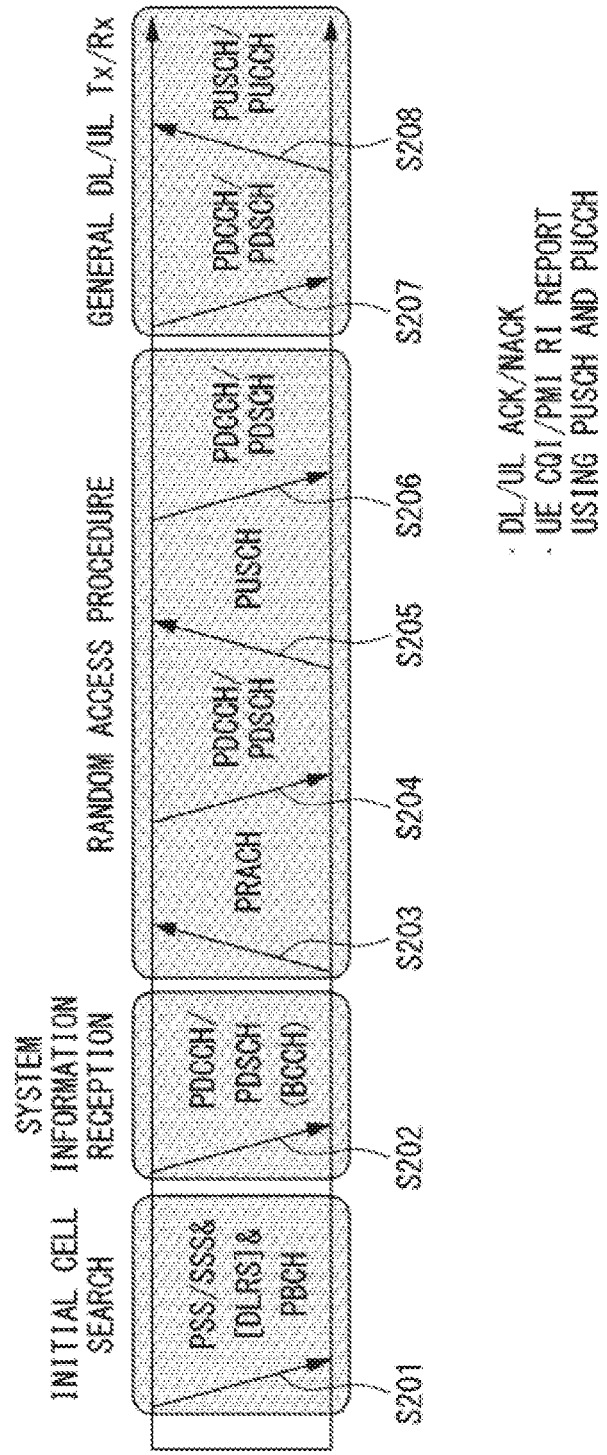
FIG. 3 is a diagram illustrating an example of a signal transmitting/receiving method in a wireless communication system.

FIG. 3 is a diagram showing an example of a signal transmission/reception method in a wireless communication system.

In a wireless communication system, a UE receives information from a base station through downlink (DL), and the UE transmits information to the base station through uplink (UL). The information transmitted and received by the base station and the UE includes data and various control information, and various physical channels exist according to a kind/use of information in which the base station and the UE transmit and receive.

When power of the UE is turned on or when the UE newly enters to a cell, the UE performs an initial cell search operation of synchronizing with the base station (S201). For this reason, the UE may receive a primary synchronization signal (PSS) and a secondary synchronization signal (SSS) from the base station to be synchronized with the base station and obtain information such as cell ID. Thereafter, the UE may receive a physical broadcast channel (PBCH) from the base station to obtain broadcast information within the cell. The UE may receive a downlink reference signal (DL RS) in an initial cell search step to check a downlink channel status.

The UE, having finished initial cell search may receive a physical downlink shared channel (PDSCH) according to a physical downlink control channel (PDCCH) and information loaded in the PDCCH to obtain more specific system information (S202).

When the UE first accesses to the base station or when there is no radio resource for signal transmission, the UE may perform a random access procedure (RACH) to the base station (S203 to S206). For this reason, the UE may transmit a specific sequence to a preamble through a physical random access channel (PRACH) (S203 and S205) and receive a random access response (RAR) message to the preamble through the PDCCH and the PDSCH corresponding thereto. In the case of a contention-based RACH, the UE may additionally perform a contention resolution procedure (S206).

The UE, having performed the above process may perform PDCCH/PDSCH reception (S207) and physical uplink shared channel (PUSCH)/physical uplink control channel (PUCCH) transmission (S208) as a general uplink/downlink signal transmission procedure. In particular, the UE receives downlink control information (DCI) through the PDCCH. Here, the DCI includes control information such as resource allocation information for the UE and may be applied in different formats according to a use purpose.

Control information transmitted by the UE to the base station through uplink or received by the UE from the base station may include a downlink/uplink ACK/NACK signal, a channel quality indicator (CQI), a precoding matrix index (PMI), and a rank indicator (RI). The UE may transmit control information such as the above-described CQI/PMI/RI through a PUSCH and/or a PUCCH.

The UE monitors a set of PDCCH candidates at monitoring occasions set to at least one control element sets (CORESETs) on a serving cell according to the corresponding search space configurations. A set of PDCCH candidates to be monitored by the UE is defined in terms of search space sets, and the search space sets may be a common search space set or a UE-specific search space set. The CORESET is configured with a set of (physical) resource blocks having time duration of 1 to 3 OFDM symbols. The network may set the UE to have a plurality of CORESETs. The UE monitors PDCCH candidates in at least one search space sets. Here, monitoring means attempting to decode the PDCCH candidate(s) in the search space. When the UE succeeds in decoding one of PDCCH candidates in a search space, the UE determines that the PDCCH has been detected in the corresponding PDCCH candidate, and performs PDSCH reception or PUSCH transmission based on DCI in the detected PDCCH. The PDCCH may be used for scheduling DL transmissions on the PDSCH and UL transmissions on the PUSCH. Here, DCI on the PDCCH includes a downlink assignment (i.e., downlink grant (DL grant)) including at least modulation and coding format and resource allocation information related to a downlink shared channel or uplink grant (UL grant) including modulation and coding format and resource allocation information related to an uplink shared channel.

An initial access (IA) procedure in a 5G communication system will be additionally described with reference to FIG. 3.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an S1 message and transmitted over a PDSCH. Each SI message is transmitted within a periodically generated time window (i.e., SI-window).

A random access (RA) procedure in a 5G communication system will be additionally described with reference to FIG. 3.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DC carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Using 5G Communication

Figure 4:
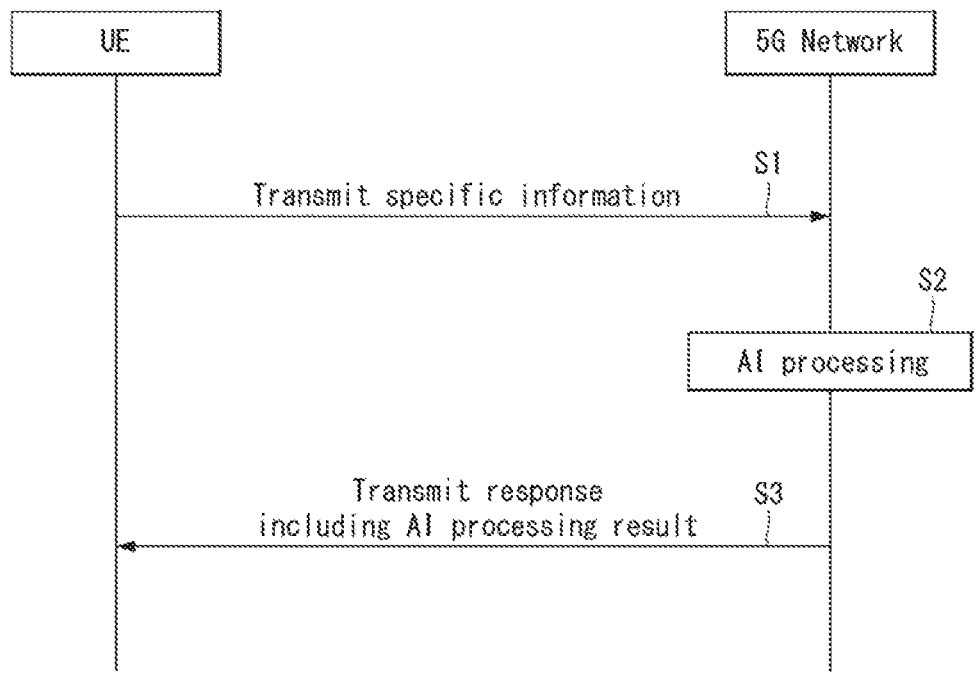
FIG. 4 illustrates an example of a basic operation of a user terminal and a 5G network in a 5G communication system.

FIG. 4 shows an example of basic operations of an UE and a 5G network in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an AI using 5G communication will be described in more detail with reference to wireless communication technology (BM procedure, URLLC, mMTC, etc.) described in FIGS. 2 and 3.

First, a basic procedure of an applied operation to which a method proposed by the present disclosure which will be described later and eMBB of 5G communication are applied will be described.

As in steps S1 and S3 of FIG. 4, the UE performs an initial access procedure and a random access procedure with the 5G network prior to step S of FIG. 4 in order to transmit/receive signals, information and the like to/from the 5G network.

More specifically, the UE performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the UE receives a signal from the 5G network.

In addition, the UE performs a random access procedure with the 5G network for UL synchronization acquisition and/or UL transmission. The 5G network can transmit, to the UE, a UL grant for scheduling transmission of specific information. Accordingly, the UE transmits the specific information to the 5G network on the basis of the UL grant. In addition, the 5G network transmits, to the UE, a DL grant for scheduling transmission of 5G processing results with respect to the specific information. Accordingly, the 5G network can transmit, to the UE, information (or a signal) related to remote control on the basis of the DL grant.

Next, a basic procedure of an applied operation to which a method proposed by the present disclosure which will be described later and URLLC of 5G communication are applied will be described.

As described above, an UE can receive DownlinkPreemption IE from the 5G network after the UE performs an initial access procedure and/or a random access procedure with the 5G network. Then, the UE receives DCI format 21 including a preemption indication from the 5G network on the basis of DownlinkPreemption IE. The UE does not perform (or expect or assume) reception of eMBB data in resources (PRBs and/or OFDM symbols) indicated by the preemption indication, hereafter, when the UE needs to transmit specific information, the UE can receive a UL grant from the 5G network.

Next, a basic procedure of an applied operation to which a method proposed by the present disclosure which will be described later and mMTC of 5G communication are applied will be described.

Description will focus on parts in the steps of FIG. 4 which are changed according to application of mMTC.

In step S1 of FIG. 4, the UE receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the UE transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 5:
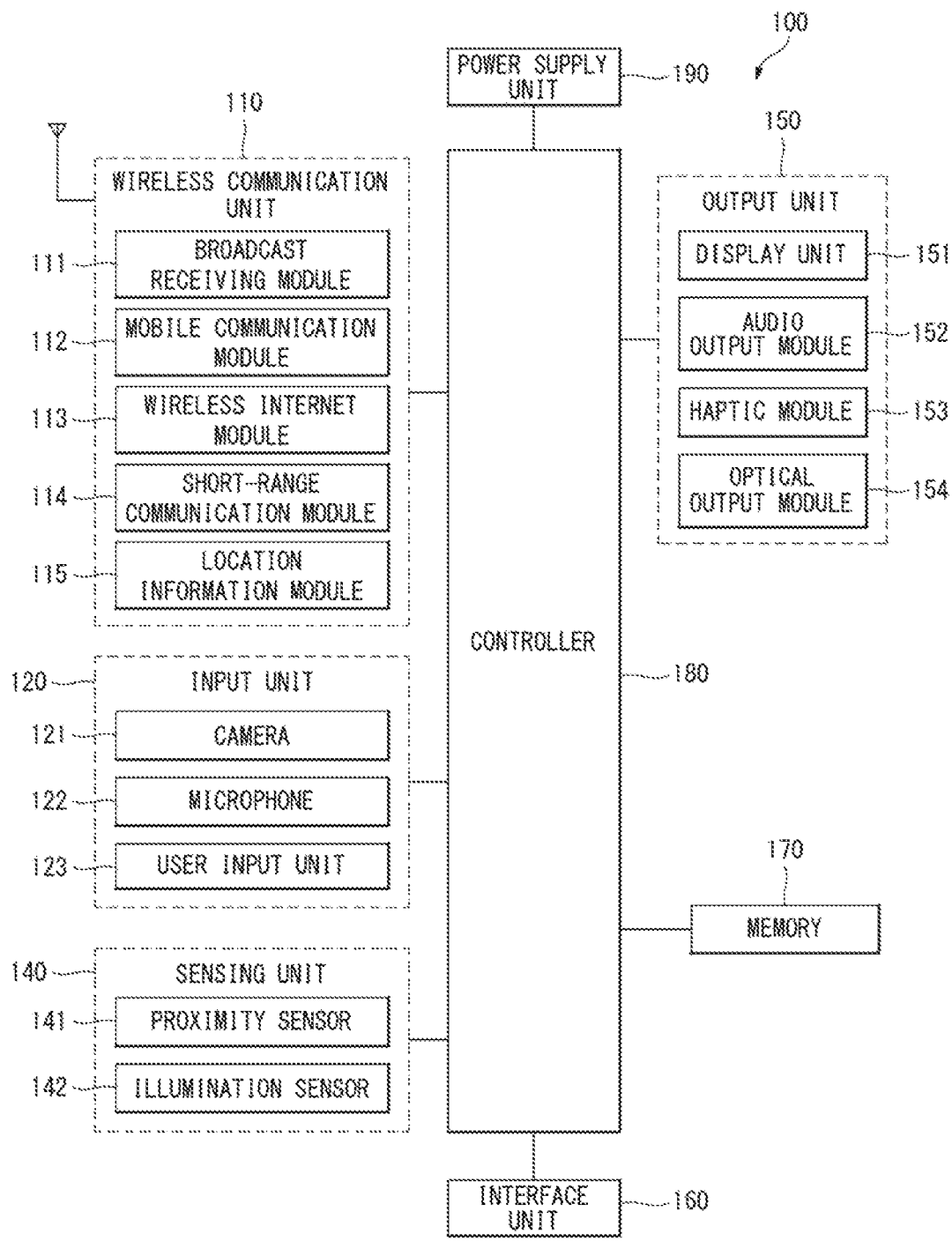
FIG. 5 is a block diagram illustrating an electronic device according to an embodiment of the present disclosure.

FIG. 5 is a block diagram illustrating an electronic device related to the present disclosure.

Referring to FIG. 5, an intelligent electronic device 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 5, the intelligent electronic device 100 is shown having wireless communication unit 110 configured with several commonly implemented components. For instance, the wireless communication unit 110 typically includes one or more components which permit wireless communication between the intelligent electronic device 100 and a wireless communication system or network within which the electronic device is located.

The wireless communication unit 110 typically includes one or more modules which permit communications such as wireless communications between the intelligent electronic device 100 and a wireless communication system, communications between the intelligent electronic device 100 and another electronic device, communications between the intelligent electronic device 100 and an external server. Further, the wireless communication unit 110 typically includes one or more modules which connect the intelligent electronic device 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the electronic device, the surrounding environment of the electronic device, user information, and the like. For example, in FIG. 5, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The intelligent electronic device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touchscreen. The touchscreen may provide an output interface between the intelligent electronic device 100 and a user, as well as function as the user input unit 123 which provides an input interface between the intelligent electronic device 100 and the user.

The interface unit 160 serves as an interface with various types of external devices that can be coupled to the intelligent electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the intelligent electronic device 100 may perform assorted control functions associated with a connected external device, in response to the external device being connected to the interface unit 160.

The memory 170 is typically implemented to store data to support various functions or features of the intelligent electronic device 100. For instance, the memory 170 may be configured to store application programs executed in the intelligent electronic device 100, data or instructions for operations of the intelligent electronic device 100, and the like. Some of these application programs may be downloaded from an external server via wireless communication. Other application programs may be installed within the intelligent electronic device 1X) at time of manufacturing or shipping, which is typically the case for basic functions of the intelligent electronic device 100 (for example, receiving a call, placing a call, receiving a message, sending a message, and the like). It is common for application programs to be stored in the memory 170, installed in the intelligent electronic device 100, and executed by the controller 180 to perform an operation (or function) for the intelligent electronic device 100.

The controller 180 typically functions to control overall operation of the intelligent electronic device 100, in addition to the operations associated with the application programs. The controller 180 may provide or process information or functions appropriate for a user by processing signals, data, information and the like, which are input or output by the various components depicted in FIG. 5, or activating application programs stored in the memory 170. As one example, the controller 180 controls some or all of the components illustrated in FIGS. 1A-IC according to the execution of an application program that have been stored in the memory 170.

The power supply unit 190 can be configured to receive external power or provide internal power in order to supply appropriate power required for operating elements and components included in the intelligent electronic device 100. The power supply unit 190 may include a battery, and the battery may be configured to be embedded in the terminal body, or configured to be detachable from the terminal body.

Referring still to FIG. 5, various components depicted in this figure will now be described in more detail. Regarding the wireless communication unit 110, the broadcast receiving module III is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external electronic device, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the intelligent electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the intelligent electronic device 100 and a wireless communication system, communications between the intelligent electronic device 100 and another intelligent electronic device 100, or communications between the electronic device and a network where another intelligent electronic device 100 (or an external server) is located, via wireless area networks. One example of the wireless area networks is a wireless personal area networks.

In some embodiments, another electronic device (which may be configured similarly to intelligent electronic device 10) may be a wearable device, for example, a smart watch, a smart glass or a head mounted display (HMD), which is able to exchange data with the intelligent electronic device 100 (or otherwise cooperate with the intelligent electronic device 100). The short-range communication module 114 may sense or recognize the wearable device, and permit communication between the wearable device and the intelligent electronic device 100. In addition, when the sensed wearable device is a device which is authenticated to communicate with the intelligent electronic device 100, the controller 180, for example, may cause transmission of data processed in the intelligent electronic device 100 to the wearable device via the short-range communication module 114. Hence, a user of the wearable device may use the data processed in the intelligent electronic device 100 on the wearable device. For example, when a call is received in the intelligent electronic device 100, the user may answer the call using the wearable device. Also, when a message is received in the intelligent electronic device 100, the user can check the received message using the wearable device.

The location information module 115 is generally configured to detect, calculate, derive or otherwise identify a position of the electronic device. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the electronic device.

As one example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module.

The input unit 120 may be configured to permit various types of input to the electronic device 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the intelligent electronic device 100. As another example, the cameras 121 may be located in a stereoscopic arrangement to acquire left and right images for implementing a stereoscopic image.

The microphone 122 is generally implemented to permit audio input to the intelligent electronic device 100. The audio input can be processed in various manners according to a function being executed in the intelligent electronic device 100. If desired, the microphone 122 may include assorted noise removing algorithms to remove unwanted noise generated in the course of receiving the external audio.

The user input unit 123 is a component that permits input by a user. Such user input may enable the controller 180 to control operation of the intelligent electronic device 100. The user input unit 123 may include one or more of a mechanical input element (for example, a key, a button located on a front and/or rear surface or a side surface of the intelligent electronic device 100, a dome switch, a jog wheel, a jog switch, and the like), or a touch-sensitive input, among others. As one example, the touch-sensitive input may be a virtual key or a soft key, which is displayed on a touchscreen through software processing, or a touch key which is located on the electronic device at a location that is other than the touchscreen. On the other hand, the virtual key or the visual key may be displayed on the touchscreen in various shapes, for example, graphic, text, icon, video, or a combination thereof.

The sensing unit 140 is generally configured to sense one or more of internal information of the electronic device, surrounding environment information of the electronic device, user information, or the like. The controller 180 generally cooperates with the sending unit 140 to control operation of the intelligent electronic device 100 or execute data processing, a function or an operation associated with an application program installed in the electronic device based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the electronic device covered by the touchscreen, or near the touchscreen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touchscreen is implemented as a capacitance type, the proximity sensor 141 can sense proximity of a pointer relative to the touchscreen by changes of an electromagnetic field, which is responsive to an approach of an object with conductivity. In this case, the touchscreen (touch sensor) may also be categorized as a proximity sensor.

The term "proximity touch" will often be referred to herein to denote the scenario in which a pointer is positioned to be proximate to the touchscreen without contacting the touchscreen. The term "contact touch" will often be referred to herein to denote the scenario in which a pointer makes physical contact with the touchscreen. For the position corresponding to the proximity touch of the pointer relative to the touchscreen, such position will correspond to a position where the pointer is perpendicular to the touchscreen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touchscreen. In addition, the controller 180 can control the intelligent electronic device 100 to execute different operations or process different data according to whether a touch with respect to a point on the touchscreen is either a proximity touch or a contact touch.

A touch sensor can sense a touch applied to the touchscreen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touchscreen or a touch key provided in addition to the touchscreen. Whether to execute the same or different control according to the object which provides a touch input may be decided based on a current operating state of the intelligent electronic device 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touchscreen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the intelligent electronic device 100. For example, the display unit 151 may display execution screen information of an application program executing at the intelligent electronic device 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the intelligent electronic device 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the intelligent electronic device 100.

An optical output module 154 can output a signal for indicating an event generation using light of a light source. Examples of events generated in the intelligent electronic device 100 may include message reception, call signal reception, a missed call, an alarm, a schedule notice, an email reception, information reception through an application, and the like.

A signal output by the optical output module 154 may be implemented in such a manner that the electronic device emits monochromatic light or light with a plurality of colors. The signal output may be terminated as the electronic device senses that a user has checked the generated event, for example.

The interface unit 160 serves as an interface for external devices to be connected with the intelligent electronic device 100. For example, the interface unit 160 can receive data transmitted from an external device, receive power to transfer to elements and components within the intelligent electronic device 100, or transmit internal data of the intelligent electronic device 100 to such external device. The interface unit 160 may include wired or wireless headset ports, external power supply ports, wired or wireless data ports, memory card ports, ports for connecting a device having an identification module, audio input/output (I/O) ports, video/O ports, earphone ports, or the like.

The identification module may be a chip that stores various information for authenticating authority of using the intelligent electronic device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the intelligent electronic device 100 is connected with an external cradle, the interface unit 160 can serve as a passage to allow power from the cradle to be supplied to the intelligent electronic device 100 or may serve as a passage to allow various command signals input by the user from the cradle to be transferred to the electronic device there through. Various command signals or power input from the cradle may operate as signals for recognizing that the electronic device is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touchscreen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The intelligent electronic device 100 may also be operated in relation to a network storage device that performs the storage function of the memory 170 over a network, such as the Internet.

The controller 180 may typically control the general operations of the intelligent electronic device 100. For example, the controller 180 may set or release a lock state for restricting a user from inputting a control command with respect to applications when a status of the electronic device meets a preset condition.

The controller 180 can also perform the controlling and processing associated with voice calls, data communications, video calls, and the like, or perform pattern recognition processing to recognize a handwriting input or a picture drawing input performed on the touchscreen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the intelligent electronic device 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 6:
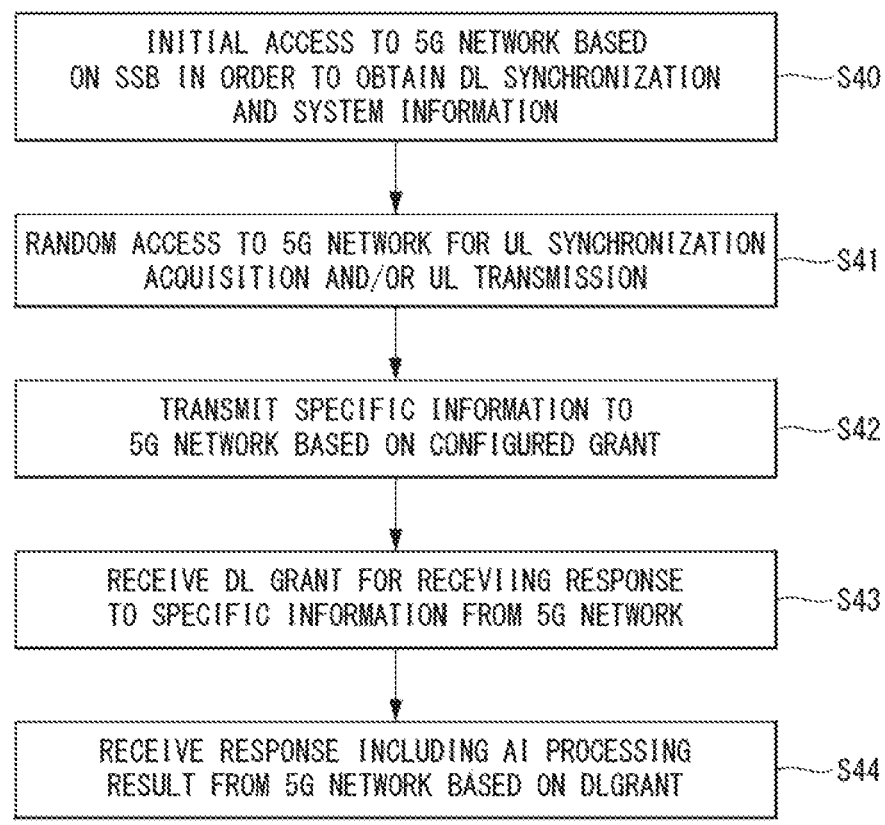
FIG. 6 illustrates an example of an operation of a user terminal using 5G communication.

FIG. 6 illustrates an example of an operation of a user terminal using 5G communication.

Next, referring to FIG. 6, the UE performs an initial access procedure with the 5G network based on SSB to obtain DL synchronization and system information (S40).

Then, the UE performs a random access procedure with the 5G network for UL synchronization acquisition and/or UL transmission (S41).

Then, the UE transmits the specific information to the 5G network based on a configured grant (S42). A procedure for configuring the grant in place of receiving the UL grant from the 5G network will be described in more detail in paragraph H.

Then, the UE receives a DL grant for receiving a response to the specific information from the 5G network (S43).

Then, the UE receives the response including the AI processing result from the 5G network based on the DL grant (S44).

Figure 7:
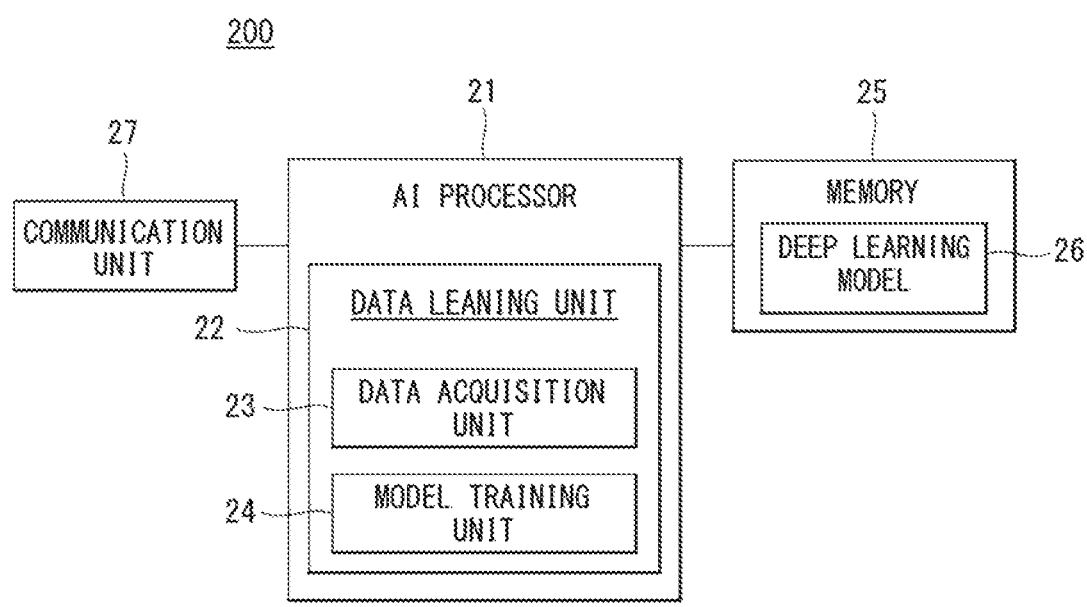
FIG. 7 is a block diagram illustrating an AI device according to an embodiment of the present disclosure.

FIG. 7 is a block diagram illustrating an AI device according to an embodiment of the present disclosure.

An AT device 200 may include an electronic device including an AI module that may perform AI processing or a server including the AI module. Further, the AI device 200 may be included as at least some components of the intelligent electronic device 100 of FIG. 5 to together perform at least some of A processing.

The AI processing may include all operations related to the control of the intelligent electronic device 100 shown in FIG. 5. For example, by performing A processing of sensing data or obtained data, the intelligent electronic device 100 may perform processing/determination and control signal generation operations. Further, for example, the intelligent electronic device 100 may perform AI processing of data received through the communication unit to perform the control of the intelligent electronic device 100.

The AI device 200 may include an AI processor 21, a memory 25 and/or a communication unit 27.

The AI processor 200 is a computing device that may learn a neural network and may be implemented into various electronic devices such as a server, a desktop PC, a notebook PC, and a tablet PC.

The AI processor 21 may learn a neural network using a program stored in the memory 25. In particular, the AI processor 21 may learn a neural network for recognizing data related to the intelligent electronic device 100. Here, the neural network for recognizing data related to the intelligent electronic device 100 may be designed to simulate a human brain structure on a computer and include a plurality of network nodes having a weight and simulating a neuron of the human neural network. The plurality of network modes may give and receive data according to each connection relationship so as to simulate a synaptic activity of neurons that send and receive signals through a synapse. Here, the neural network may include a deep learning model developed in the neural network model. In the deep learning model, while a plurality of network nodes is positioned in different layers, the plurality of network nodes may send and receive data according to a convolution connection relationship. An example of the neural network model includes various deep learning techniques such as deep neural networks (DNN), convolutional deep neural networks (CNN), Recurrent Boltzmann Machine (RNN), Restricted Boltzmann Machine (RBM), deep belief networks (DBN), and a deep Q-network and may be applied to the field of computer vision, speech recognition, natural language processing, and voice/signal processing.

The processor for performing the above-described function may be a general-purpose processor (e.g., CPU), but may be an AI dedicated processor (e.g., GPU) for learning AI.

The memory 25 may store various programs and data necessary for an operation of the AI device 200. The memory 25 may be implemented into a non-volatile memory, a volatile memory, a flash memory, a hard disk drive (HDD), or a solid state drive (SSD) and the like. The memory 25 may be accessed by the AI processor 21 and read/write/modify/delete/update of data may be performed by the AI processor 21. Further, the memory 25 may store a neural network model (e.g., a deep learning model 26) generated through learning algorithm for data classification/recognition according to an embodiment of the present disclosure.

The AI processor 21 may include a data learning unit 22 for learning a neural network for data classification/recognition. The data learning unit 22 may learn learning data to use in order to determine data classification/recognition and a criterion for classifying and recognizing data using learning data. By obtaining learning data to be used for learning and applying the obtained learning data to a deep learning model, the data learning unit 22 may learn a deep learning model.

The data learning unit 22 may be produced in at least one hardware chip form to be mounted in the AI device 200. For example, the data learning unit 22 may be produced in a dedicated hardware chip form for artificial intelligence (AI) and may be produced in a part of a general-purpose processor (CPU) or a graphic dedicated processor (GPU) to be mounted in the AI device 200. Further, the data learning unit 22 may be implemented into a software module. When the data learning unit 22 is implemented into a software module (or program module including an instruction), the software module may be stored in non-transitory computer readable media. In this case, at least one software module may be provided by an Operating System (OS) or may be provided by an application.

The data learning unit 22 may include a learning data acquisition unit 23 and a model learning unit 24.

The learning data acquisition unit 23 may obtain learning data necessary for a neural network model for classifying and recognizing data. For example, the learning data acquisition unit 23 may obtain data and/or sample data of the intelligent electronic device 100 for inputting as learning data to the neural network model.

The model learning unit 24 may learn to have a determination criterion in which a neural network model classifies predetermined data using the obtained learning data. In this case, the model learning unit 24 may learn a neural network model through supervised learning that uses at least a portion of the learning data as a determination criterion. Alternatively, the model learning unit 24 may learn the neural network model through unsupervised learning that finds a determination criterion by self-learning using learning data without supervision. Further, the model learning unit 24 may learn the neural network model through reinforcement learning using feedback on whether a result of situation determination according to learning is correct. Further, the model learning unit 24 may learn the neural network model using learning algorithm including error back-propagation or gradient decent.

When the neural network model is learned, the model learning unit 24 may store the learned neural network model in the memory. The model learning unit 24 may store the learned neural network model at the memory of the server connected to the AI device 200 by a wired or wireless network.

In order to improve an analysis result of a recognition model or to save a resource or a time necessary for generation of the recognition model, the data learning unit 22 may further include a learning data pre-processor (not illustrated) and a learning data selecting unit (not illustrated).

The learning data pre-processor may pre-process obtained data so that the obtained data may be used in learning for situation determination. For example, the learning data pre-processor may process the obtained data in a predetermined format so that the model learning unit 24 uses obtained learning data for learning for image recognition.

Further, the learning data selection unit may select data necessary for learning among learning data obtained from the learning data acquisition unit 23 or learning data pre-processed in the pre-processor. The selected learning data may be provided to the model learning unit 24. For example, by detecting a specific area of an image obtained through a camera of the intelligent electronic device 100, the learning data selection unit may select only data of an object included in the specified area as learning data.

Further, in order to improve an analysis result of the neural network model, the data learning unit 22 may further include a model evaluation unit (not illustrated).

The model evaluation unit inputs evaluation data to the neural network model, and when an analysis result output from evaluation data does not satisfy predetermined criteria, the model evaluation unit may enable the model learning unit 24 to learn again. In this case, the evaluation data may be data previously defined for evaluating a recognition model. For example, when the number or a proportion of evaluation data having inaccurate analysis results exceeds a predetermined threshold value among analysis results of a learned recognition model of evaluation data, the model evaluation unit may evaluate evaluation data as data that do not satisfy predetermined criteria.

The communication unit 27 may transmit an AI processing result by the AI processor 21 to an external electronic device.

It has been described that the AI device 200 of FIG. 7 is functionally divided into the AI processor 21, the memory 25, and the communication unit 27, but the above-mentioned components may be integrated into a single module to be referred to as an A module.

Recently, with the development of information and communication technology, diversification and functions of smartphones have been much improved. Accordingly, spread of smartphones has been rapidly progressed, and more than one smartphone per person is being distributed.

With the spread of smartphones, in a specific situation, a situation has occurred in which notification providing is required through a notification setting appropriate to the situation, and there has been inconvenience in that a user should change a notification setting each time in a specific situation for an appropriate notification setting and there was a problem that a case occurs in which the user does not change the notification setting by an error.

In the present disclosure, in order to solve the above-described inconvenience and problem, a method is proposed in which the smartphone recognizes a surrounding situation to provide a notification through notification setting appropriate to the surrounding situation.

Hereinafter, the smartphone described in the present disclosure may be used interchangeably with the terminal.

Figure 8:
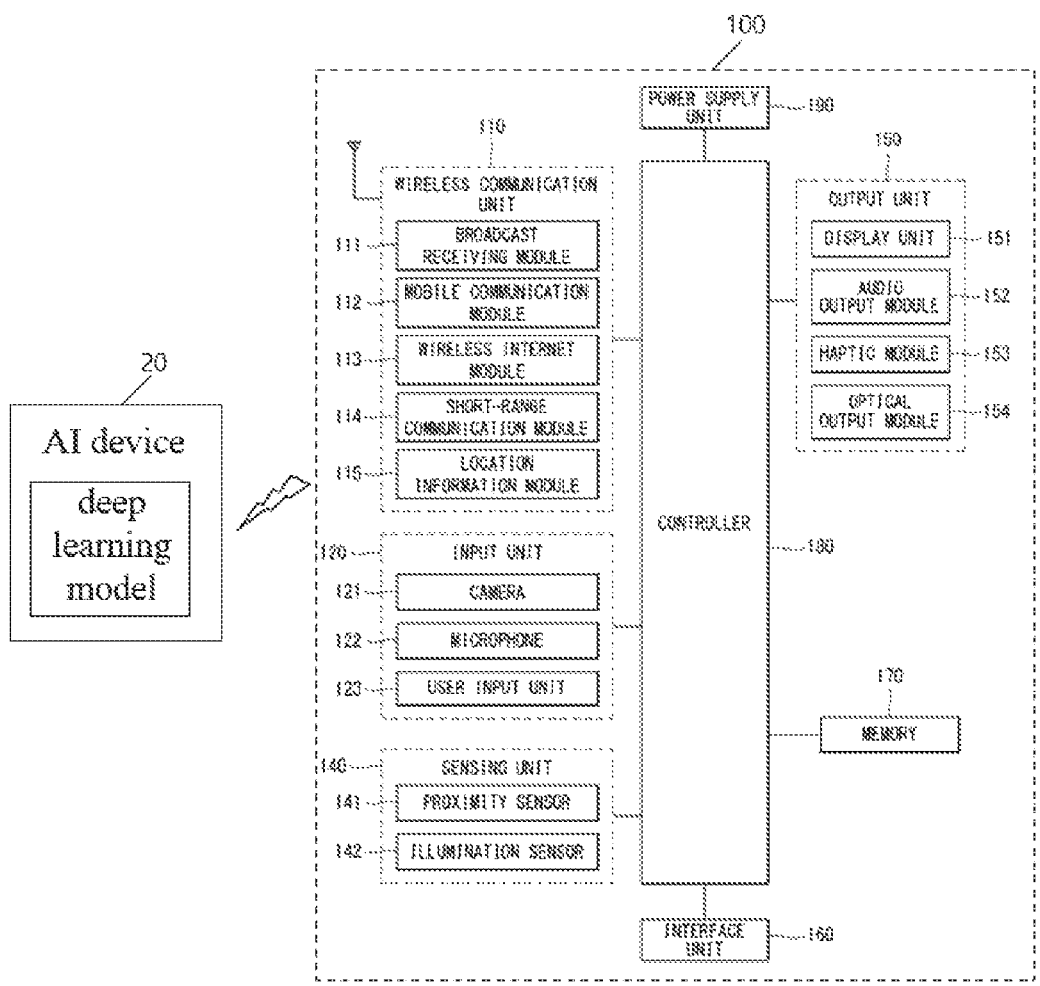
FIG. 8 is a view illustrating a system in which an intelligent electronic device and an AI device are associated with each other according to an embodiment of the disclosure.

FIG. 8 is a view illustrating a system in which an intelligent electronic device and an AI device are associated with each other according to an embodiment of the disclosure.

Referring to FIG. 8, an intelligent electronic device may transmit data requiring AI processing to an AI device 20. The AI device 20 including a deep learning model 26 may transmit a result of AI processing using the deep learning model 26 to the intelligent electronic device. For details of the AI device 20, reference may be made to what has been described above in connection with FIG. 7.

The intelligent electronic device 100 may include a wireless communication unit 110, an input unit 120, a sensing unit 140, an output unit 150, an interface unit 160, a memory 170, a processor 180, and a power supply unit 190. The processor 180 may include an AI processor 181.

The wireless communication unit 110, input unit 120, sensing unit 140, output unit 150, interface unit 160, memory 170, and power supply unit 190 have been described above in detail in connection with FIG. 5 and no further description thereof is given below.

The intelligent electronic device 100 may transmit data obtained via at least one sensor to the AI device 20 via the wireless communication unit 110. The AI device 20 may transmit AI processing data generated by applying a neural network model 26 to the transmitted data to the intelligent electronic device 100.

The intelligent electronic device 100 may recognize face information, which is sensing information, based on the received AI processing data. The intelligent electronic device 100 may compare the obtained face information with a preconfigured default cluster and, if it falls out of the default cluster, extract a face vector from the face information, recognize an age variation state for the face based on the face vector and, if the face vector is recognized as being in the age variation state for the face, add the face vector to the default cluster to thereby configure an expanded cluster.

The intelligent electronic device 100 may transmit data necessary for recognizing the face according to the user's age variation to the AI device 20 via the wireless communication unit 110. The AI device 20 may transmit AI processing data, generated by applying the neural network model 26 to the received data, to the intelligent electronic device 100. The intelligent electronic device 100 may recognize the user's face according to the age variation state for the face, based on the received AI processing data.

The AI processor 181 may generate age variation state data for the face by applying the neural network model to sensing data generated from at least one sensor. The AI processing data generated by applying the neural network model may include, e.g., feature data for the face's features, ratio data for the face's ratio, and combination data for a combination of faces.

The processor 180 may generate a signal related to the age variation state for the face using the face image captured by the intelligent electronic device 100 and a face vector extracted based on the face image.

The intelligent electronic device 100 may transmit sensing data obtained via at least one sensor to the AI device 20 via the communication unit 22. The AI device 20 may transmit AI processing data generated by applying the neural network model 26 to the transferred sensing data to the intelligent electronic device 100.

The location information module 115 may generate location data of the intelligent electronic device 100. The location information module 115 may include at least any one of a global positioning system (GPS) and a differential global positioning system (DGPS).

The AI processor 181 may generate more precise location data of the intelligent electronic device 100 by applying a neural network model to the location data generated from the location information module 115.

The intelligent electronic device 100 may transmit the location data obtained from the location information module 115 to the AI device 20 via the wireless communication unit 110. The AI device 20 may transmit AI processing data generated by applying the neural network model 26 to the received location data to the location information module 115.

The AI processor 181 may apply face-related information received from at least one sensor of the intelligent electronic device 100 and information received via Wi-Fi communicating with the intelligent electronic device 100 to the neural network model, thereby transferring a signal related to the age variation state for the age to the processor 180.

The processor 180 may obtain face information via the AI processor 181 and, based thereupon, recognize an age variation for the face.

5G communication necessary for implementing a method for configuring a mode of an intelligent electronic device 100, according to an embodiment, and embodiments for performing AI processing by adopting 5G communication and transmitting/receiving the results of AI processing have been described above.

Described below is a specific method of actively or passively intervening the age variation state for the user's face based on the user's face information according to an embodiment, with reference to necessary drawings.

Figure 9:
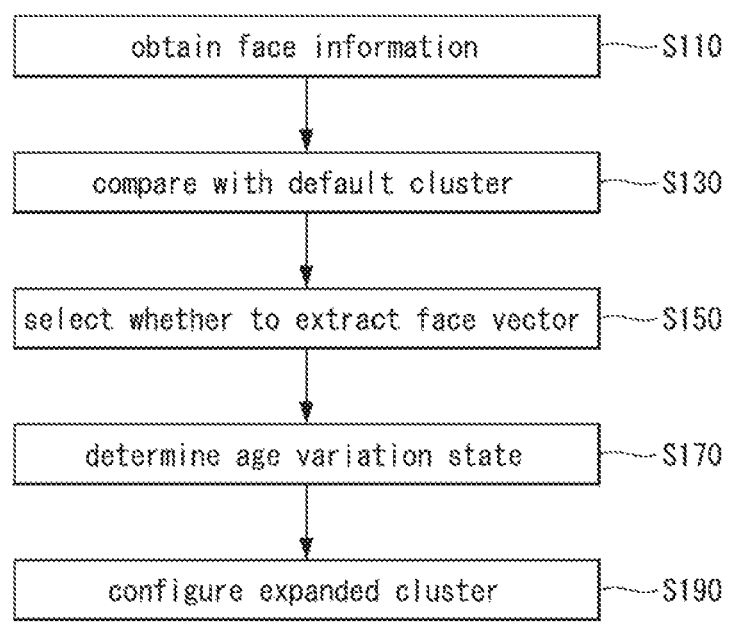
FIG. 9 is a flowchart illustrating a face recognition method using an intelligent electronic device according to an embodiment of the disclosure.

FIG. 9 is a flowchart illustrating a face recognition method using an intelligent electronic device according to an embodiment of the disclosure.

A face recognition method using an intelligent electronic device according to an embodiment may be implemented on an intelligent device including the functions described above in connection with FIGS. 1 to 8. Specifically, the face recognition method using an intelligent electronic device according to an embodiment may be implemented on the intelligent electronic device 100 described above in connection with FIGS. 5, 7, and 8.

A processor (180 of FIG. 5) may detect a face area from the user's face captured and obtain face information from the face area (S110). The processor may capture the user's face via at least one or more cameras and detect the face area from the captured user face via a plurality of sensors. The processor may obtain face information from the detected face area. The face information may include position information for the user's eye, nose, mouth, eyebrow, forehead, chin, and ear, ratio information for an interval of the user's eye, nose, mouth, eyebrow, forehead, chin, and ear, and shape information for the user's eye, nose, mouth, eyebrow, forehead, chin, and ear. The processor (180 of FIG. 5) may obtain various pieces of face information for the user's face from the user's eye, nose, mouth, eyebrow, forehead, chin, and ear using at least one or more sensors.

The processor 180 may compare the obtained face information with a preconfigured default cluster (S130). The default cluster may be configured based on a face feature extracted from position information for the user's eye, nose, mouth, eyebrow, forehead, chin, and ear, ratio information for an interval of the user's eye, nose, mouth, eyebrow, forehead, chin, and ear, and shape information for the user's eye, nose, mouth, eyebrow, forehead, chin, and ear. The processor may cluster several face features generated for one piece of face information via the preconfigured default cluster, thereby generating one face feature.

The processor 180 may select whether to extract a feature vector from the face information according to the result of comparison (S150). The processor 180 may compare the face information with the default cluster, thereby selecting whether the face information is included in the preconfigured default cluster.

The processor 180 may determine the age variation state for the user's face based on the extracted face vector (S170). The processor may perform a pre-treatment process on the user's face vector extracted or obtained and then extract a face feature vector, thereby configuring the age variation state for the user's face. The face feature vector may be configured per frame of the face area. As many face feature vectors as the number of exposed frames may be generated. To extract the face feature vector, principal component analysis (PCA), elastic bunch graph matching, linear discrimination analysis (LDA), or other feature extraction schemes may be used.

Upon determining that the face vector is the age variation state for the user's age, the processor 180 may configure an expanded cluster by adding the face feature vector to the default cluster (S190). The processor 180 may expand the range of the default cluster by adding the face feature vector. The expanded default cluster may be defined as an expanded cluster.

The processor 180 may configure a range of the expanded cluster by further adding the face feature vector to the face feature extracted from position information for the user's eye, nose, mouth, eyebrow, forehead, chin, and ear, ratio information for an interval of the user's eye, nose, mouth, eyebrow, forehead, chin, and ear, and shape information for the user's eye, nose, mouth, eyebrow, forehead, chin, and ear. The range of the expanded cluster may be configured to have a broader range than the default cluster.

Figure 10:
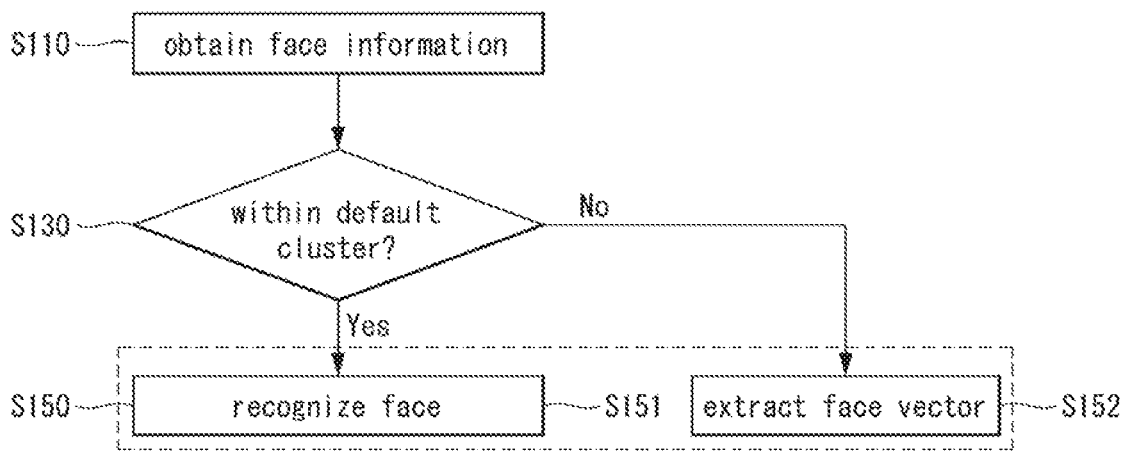
FIG. 10 is a flowchart illustrating an example of extracting a face vector in a face recognition method using an intelligent electronic device according to an embodiment of the disclosure.

FIG. 10 is a flowchart illustrating an example of extracting a face vector in a face recognition method using an intelligent electronic device according to an embodiment of the disclosure.

A processor (180 of FIG. 5) may detect a face area from the user's face captured and obtain face information from the face area (S110).

The processor 180 may compare the obtained face information with a preconfigured default cluster (S130). The processor may cluster several face features generated for one piece of face information via the preconfigured default cluster, thereby generating one face feature.

Where the face information falls within the preconfigured default cluster, the processor 180 may recognize the user's face or terminate the process (S151). Where the obtained face information falls within the preconfigured default cluster, the processor 180 may determine that the user's face captured is recognizable.

In contrast, where the face information falls out of the preconfigured default cluster, the processor 180 may extract the face vector from the face information (S152). Unless the obtained face information falls within the preconfigured default cluster, the processor 180 may determine that the user's face captured is not recognizable and may extract the face vector from the face information. The face vector may have a range expanded by adding the face information similarity to the face information.

Figure 11:
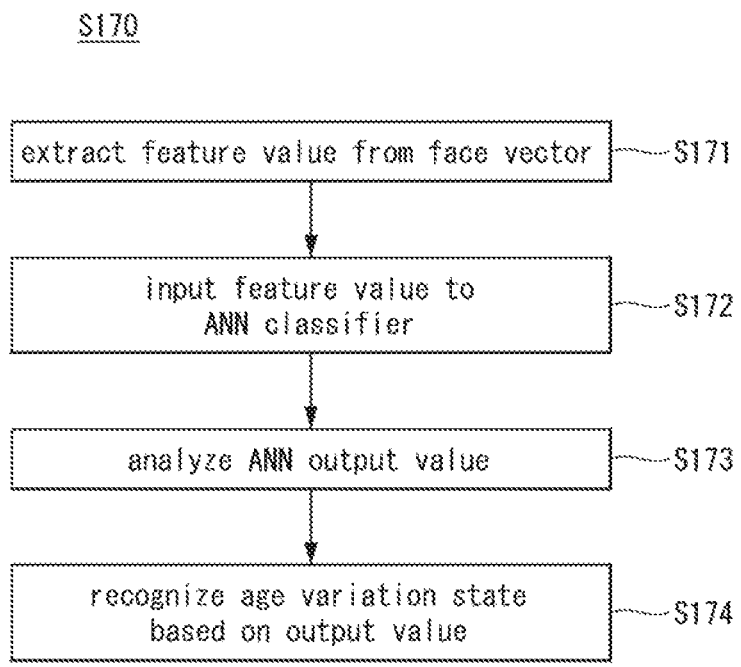
FIG. 11 is a view illustrating an example of determining an age variation state in a face recognition method using an intelligent electronic device according to an embodiment of the disclosure.

FIG. 11 is a view illustrating an example of determining an age variation state in a face recognition method using an intelligent electronic device according to an embodiment of the disclosure.

Referring to FIG. 11, the processor 180 may extract feature values from an extracted face vector (S171).

The processor 180 may input the feature values to an artificial neural network (ANN) classifier trained to identify the age variation state. For example, the processor 180 may receive a captured image or video from at least one camera. The processor 180 may detect a face area from the captured image or video, obtain detected face information, and extract feature values from the obtained face information. The feature value may specifically indicate information for determining the age variation state.

The processor 180 may control to input the feature values to an artificial neural network (ANN) classifier trained to identify the age variation state (S172).

The processor 180 may generate a recognition detection input by merging the extracted feature values. The recognition detection input may be input to the ANN classifier trained to identify the age variation state based on the extracted feature value.

The processor 180 may analyze the output value of the ANN (S173) and determine the age variation state based on the output value of the ANN (S174). The processor 180 may identify the age variation state from the output of the ANN classifier.

Although FIG. 11 illustrates that the operation of identifying the age variation state via AI processing is implemented on processing by the intelligent electronic device 100, the disclosure is not limited thereto. For example, the AI processing may be performed on a 5G network based on the face information received from the intelligent electronic device 100.

Figure 12:
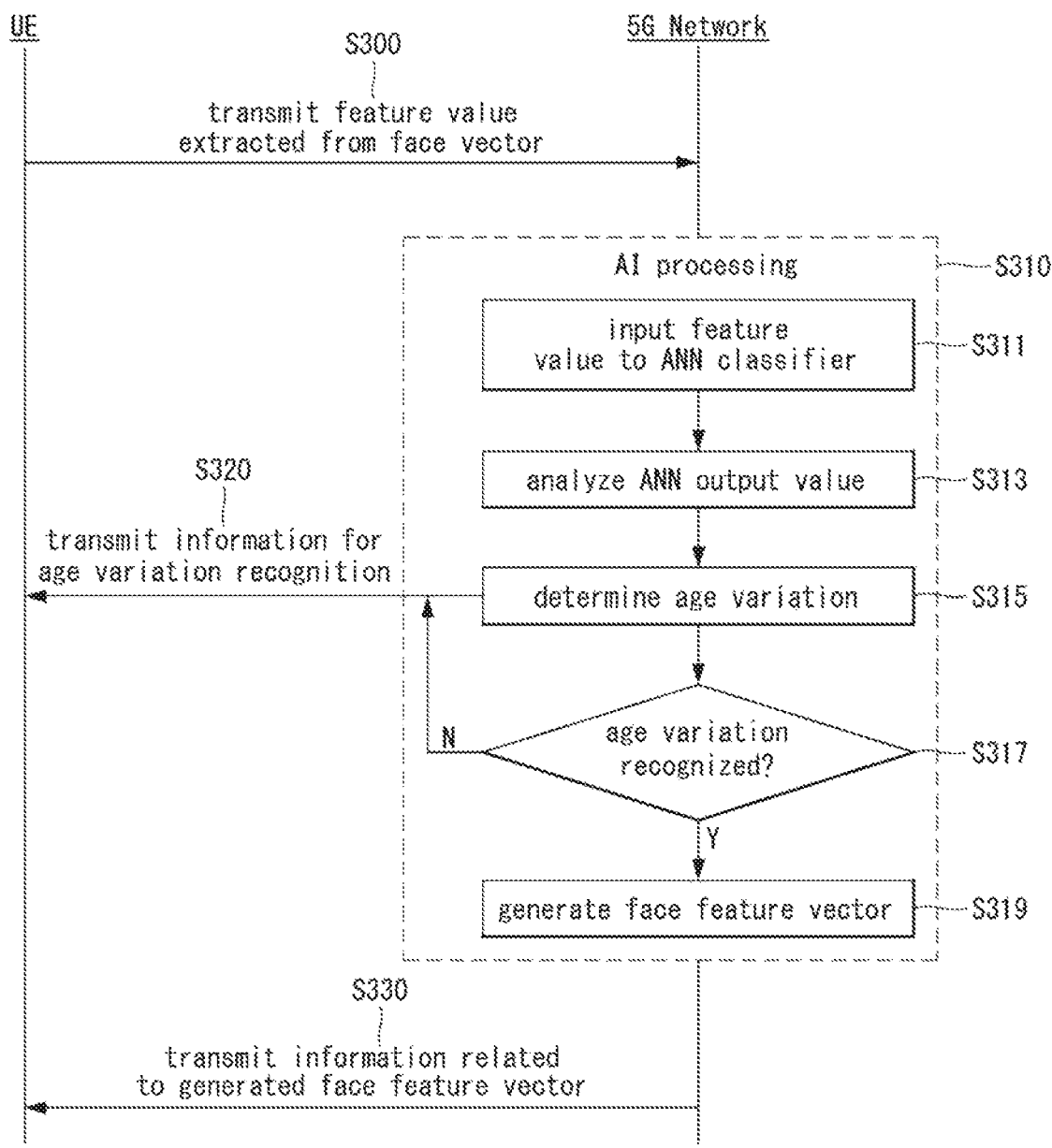
FIG. 12 is a view illustrating an example of determining an age variation state in a face recognition method using an intelligent electronic device according to an embodiment of the disclosure.

FIG. 12 is a view illustrating an example of determining an age variation state in a face recognition method using an intelligent electronic device according to an embodiment of the disclosure.

The processor 180 may control a transceiver to transmit face information to an AI processor included in a 5G network. The processor 180 may control the transceiver to receive the AI-processed information from the AI processor.

The AI-processed information may be information resultant from determining the age variation state.

The intelligent electronic device 100 may perform an initial access procedure with the 5G network to transmit the face information to the 5G network. The intelligent electronic device 100 may perform the initial access procedure with the 5G network based on a synchronization signal block (SSB).

The intelligent electronic device 100 may receive, from the network through the transceiver, downlink control information (DCI) used for scheduling transmission of sensing information obtained from at least one sensor included therein.

The processor 180 may transmit face information to the network based on the DCI.

The face information may be transmitted to the network via a physical uplink shared channel (PUSCH), and the DM-RSs of the synchronization signal block (SSB) and PUSCH may be quasi co-located (QCL) for QCL type D.

Referring to FIG. 12, an intelligent electronic device 100 may transmit feature values extracted from face information to a 5G network (S300).

The 5G network may include an AI processor or an AI system, and the A system of the 5G network may perform AI processing based on the received face information (S310).

The AI system may input the feature values received from the intelligent electronic device 100 to an ANN classifier (S311). The AI system may analyze the ANN output value (S313) and determine an age variation or age variation state from the ANN output value (S315). The 5G network may transmit information for recognition of the age variation, determined by the AI system, to the intelligent electronic device 100 (S320).

The information for recognition of the age variation may be information by which the age variation state may be determined.

Upon determining the recognition of the age variation (S317), the A system may generate or extract a face feature vector (S319). Upon determining the age variation state (S917), the AI system may control to generate or extract the face feature vector from the face vector (S319) and to configure an expanded cluster by adding the face feature vector to the default cluster.

The AI system may transmit information (or signal) related to the face feature vector generated or extracted, to the intelligent electronic device 100 (S330).

The intelligent electronic device 100 may transmit only face information to the 5G network, and the AI system included in the 5G network may extract the feature value corresponding to the recognition detection input which is to be used as an input to the ANN to determine the age variation state from the face information.

Figure 13:
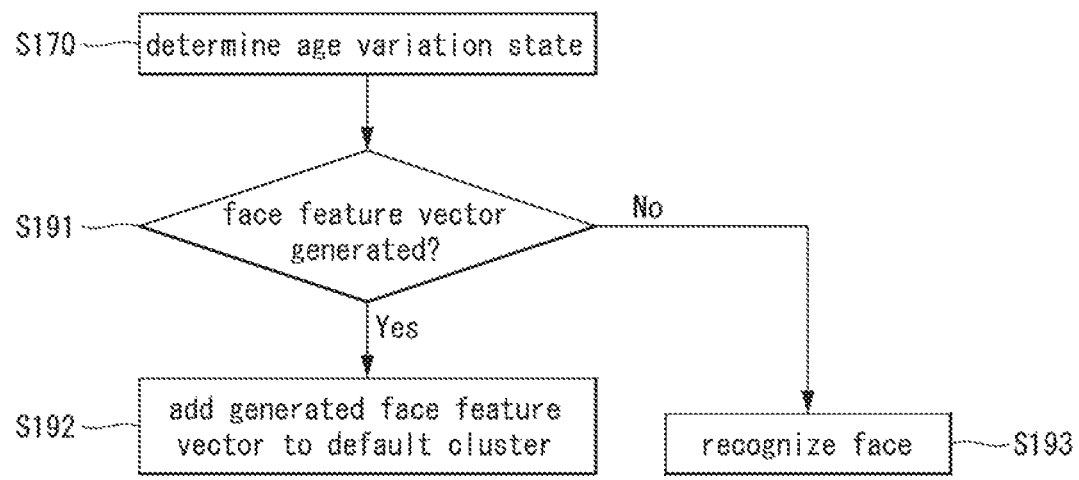
FIG. 13 is a view illustrating an example of configuring an expanded cluster in a face recognition method using an intelligent electronic device according to an embodiment of the disclosure.

FIG. 13 is a view illustrating an example of configuring an expanded cluster in a face recognition method using an intelligent electronic device according to an embodiment of the disclosure.

Referring to FIG. 13, the processor 180 may determine the age variation state for the user's face based on the extracted face vector (S170).

The processor 180 may perform a pre-treatment process on the user's face vector extracted or obtained, and may then generate or extract the face feature vector (S191).

The processor may determine the age variation state for the user's face based on the extracted face feature vector. The face feature vector may be configured per frame of the face area. As many face feature vectors as the number of exposed frames may be generated. To extract the face feature vector, principal component analysis (PCA), elastic bunch graph matching, linear discrimination analysis (LDA), or other feature extraction schemes may be used.

The processor 180 may compare the extracted face feature vector with face information pre-stored in the default cluster, thereby discovering and determining the most similar face information. The default cluster may be denoted a user registration model database.

The processor 180 may search the user registration model database for the most similar registration model to the pre-stored registration models. The registration model may include a plurality of pieces of face information. The processor 180 may calculate the similarity via the above-described search. The processor 180 may search for the registration model having the face information with the highest similarity among the plurality of pieces of face information. The user registration model database may previously store registration models using a plurality of pieces of face information extracted from the user.

The processor 180 may use an artificial neural network-based method and a template matching-based method to determine whether the extracted or generated face feature vector regards the user's face feature.

If the face feature vector is generated, the processor 180 may add the face feature vector to the default cluster (S94). The processor 180 may configure an expanded default cluster by adding the generated face feature vector to the default cluster. The expanded default cluster may be denoted as an expanded cluster.

If no face feature vector is generated, the processor 180 may recognize the user's face based on the default cluster (S193).

Figure 14:
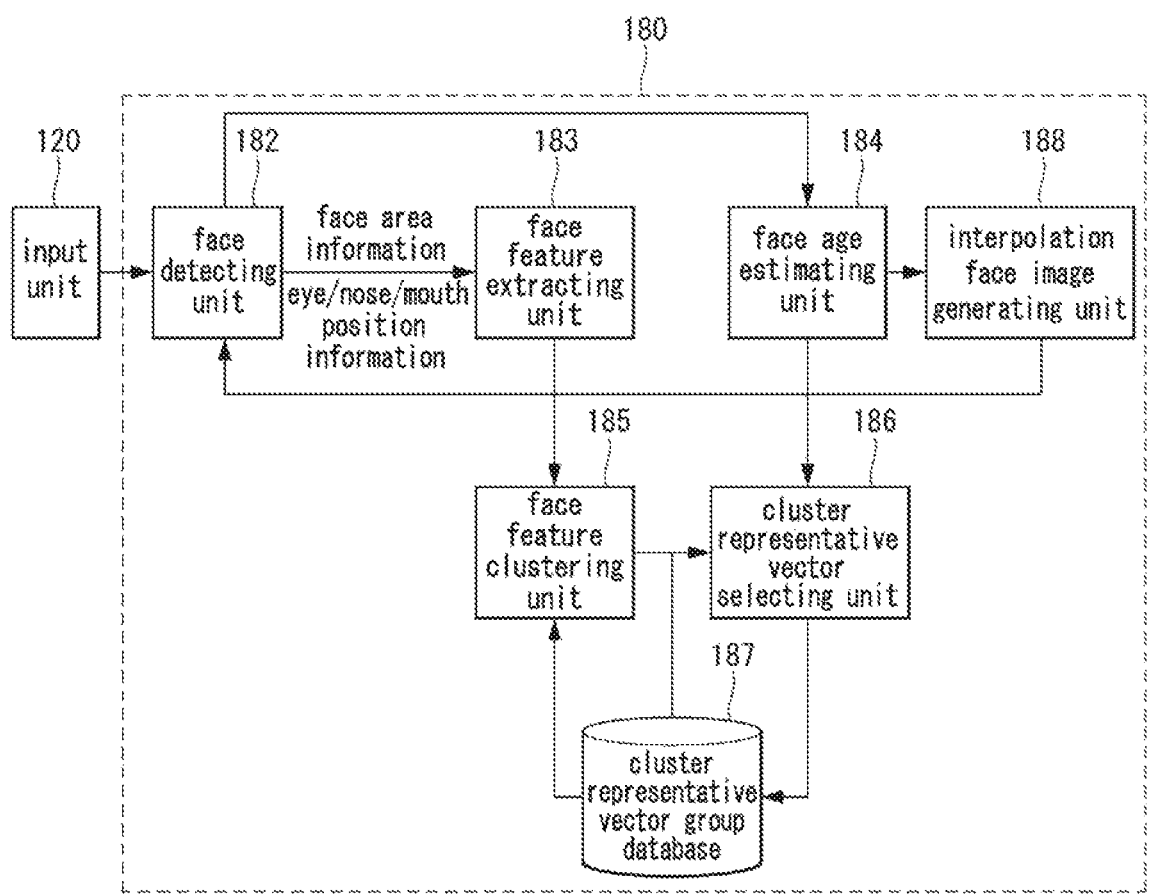
FIG. 14 is a view illustrating a processor in an intelligent electronic device according to an embodiment of the disclosure.

FIG. 14 is a view illustrating a processor in an intelligent electronic device according to an embodiment of the disclosure.

Referring to FIG. 14, a processor 180 may include a face detecting unit 182, a face feature extracting unit 183, a face age estimating unit 184, a face feature clustering unit 185, a cluster representative vector selecting unit 186, a cluster representative vector group database 187, and an interpolation face image generating unit 188.

The face detecting unit 182 may detect a face area from an image captured by the input unit 120. The face detecting unit 182 may detect the face area from the user's face captured and obtain face information from the detected face area. The face information may include position information for the user's eye, nose, mouth, eyebrow, forehead, chin, and ear, ratio information for an interval of the user's eye, nose, mouth, eyebrow, forehead, chin, and ear, and shape information for the user's eye, nose, mouth, eyebrow, forehead, chin, and ear.

The face feature extracting unit 183 may receive face information and face area information from the face detecting unit 182 and extract face features. The face feature extracting unit 183 may extract face features from position information for the user's eye, nose, mouth, eyebrow, forehead, chin, and ear, ratio information for an interval of the user's eye, nose, mouth, eyebrow, forehead, chin, and ear, and shape information for the user's eye, nose, mouth, eyebrow, forehead, chin, and ear.

The face feature clustering unit 185 may receive face features from the face feature extracting unit 183 and pre-stored position information for the user's eye, nose, mouth, eyebrow, forehead, chin, and ear, ratio information for an interval of the user's eye, nose, mouth, eyebrow, forehead, chin, and ear, and shape information for the user's eye, nose, mouth, eyebrow, forehead, chin, and ear, from the cluster representative vector group database 187 and may cluster them. The face feature clustering unit 185 may cluster several face features generated for one piece of face information into one face feature.

The face age estimating unit 184 may receive face information and face area information from the face detecting unit 182, thereby extracting or generating a face vector by which the age for the user's face may be estimated. The face age estimating unit may estimate the age group for the user's face using a local binary pattern (LBP) or ANN-based multi-classification technique.

The cluster representative vector selecting unit 186 may receive the face vector from the face age estimating unit 184 and the face feature from the face feature clustering unit 185, analyze and learn them, and select a representative vector. The cluster representative vector selecting unit 186 may be trained using the above-described ANN and select the representative vector according to the results of training. The representative vector may be denoted a face feature vector.

The cluster representative vector group database 187 may receive the selected face feature vector or representative vector from the cluster representative vector selecting unit 186 and store face information and information clustered into one face feature, from the face feature clustering unit 185.

The interpolation face image generating unit 188 may receive the face vector from the face age estimating unit 184 and generate an interpolation face image. The interpolation face image generating unit 188 may generate a face image for the median age group for the face images of different age groups using an generation neural network, such as Style GAN.

Figure 15:
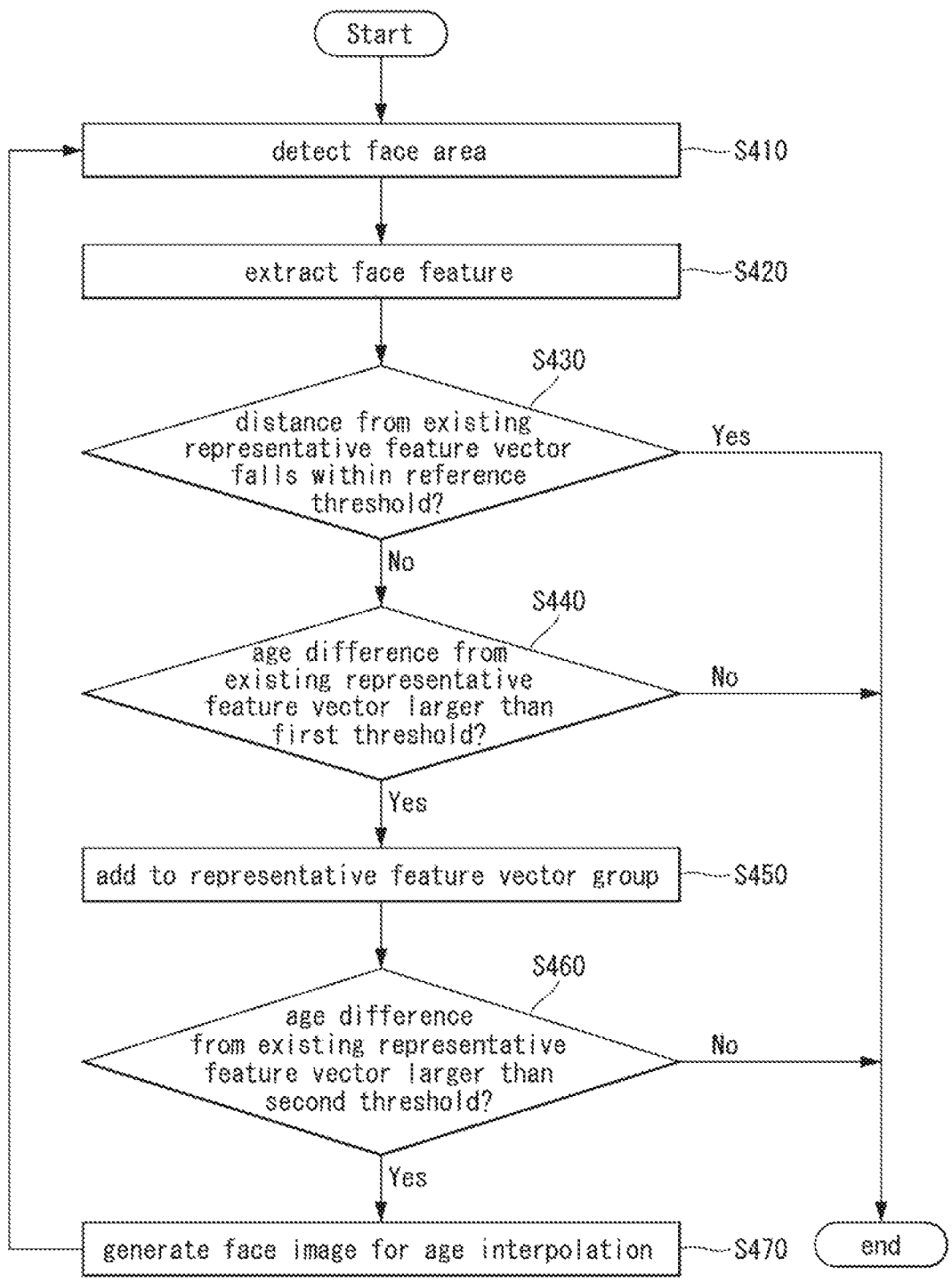
FIG. 15 is a view illustrating a face recognition method using an intelligent electronic device according to an embodiment of the disclosure.
Figure 16:
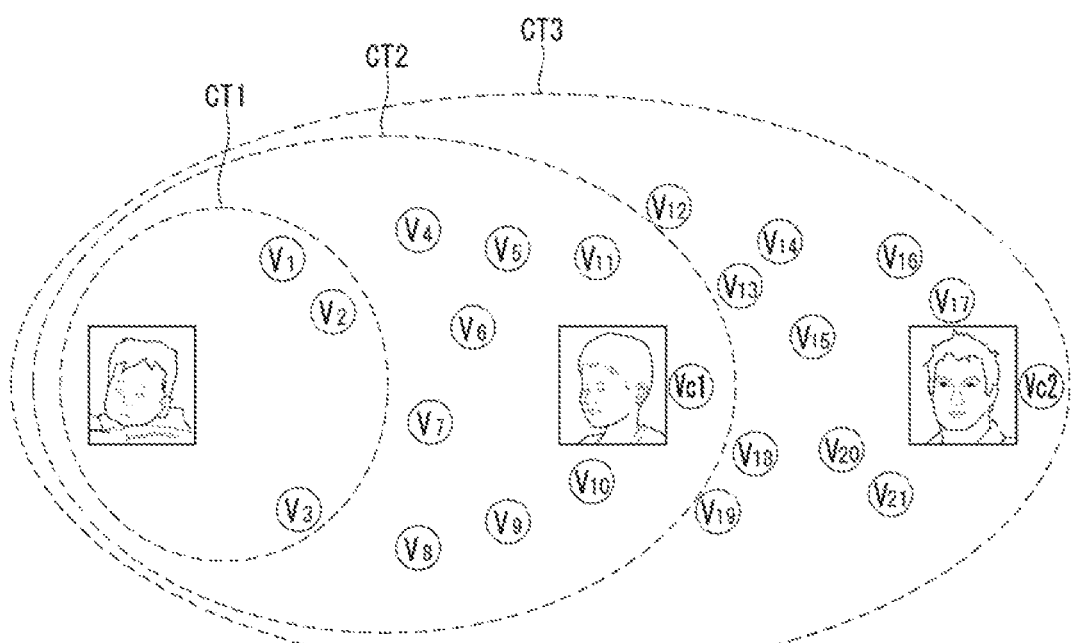
FIG. 16 is a view illustrating an example of configuring a cluster according to an embodiment of the disclosure.

FIG. 15 is a view illustrating a face recognition method using an intelligent electronic device according to an embodiment of the disclosure. FIG. 16 is a view illustrating an example of configuring a cluster according to an embodiment of the disclosure.

FIGS. 15 and 16 illustrate a face recognition method using an intelligent electronic device according to an embodiment.

The processor may detect a face area (S410). The processor may detect the face area from the user's face captured and obtain face information from the detected face area. For example, the face information may include position information for the user's eye, nose, mouth, eyebrow, forehead, chin, and ear, ratio information for an interval of the user's eye, nose, mouth, eyebrow, forehead, chin, and ear, and shape information for the user's eye, nose, mouth, eyebrow, forehead, chin, and ear.

The processor may extract a face feature (S430). The processor may extract the face feature using the obtained face information. For example, the processor may extract the face feature from position information for the user's eye, nose, mouth, eyebrow, forehead, chin, and ear, ratio information for an interval of the user's eye, nose, mouth, eyebrow, forehead, chin, and ear, and shape information for the user's eye, nose, mouth, eyebrow, forehead, chin, and ear.

The processor may compare the distance of an existing representative feature vector with a reference threshold (S430). The existing representative feature vector may be denoted a face feature. The reference threshold CT1 may be denoted a reference cluster CT1. The distance of the existing representative feature vector may be defined with a range similar to the face feature or capable of expanding the face feature.

The processor may cluster several face features generated for one piece of face information into one face feature. The processor may extract face features V1 to V3 from the face information. The processor may configure the reference cluster CT1 which is the reference threshold CT1, based on prestored face information. For example, the reference cluster CT1 may be configured based on the face information captured when the user has an infant face.

Where the distance of the existing representative feature vector falls out of the reference threshold CT1, the processor may extract the face vector from the face feature. Unless the distance of the existing representative feature vector falls out of the reference threshold CT1, the processor may recognize the face based on the extracted face feature or face information or, because there is no need for extracting the face vector, terminate the process.

The processor may compare the existing representative feature vector and age difference with a first threshold (S440). The first threshold CT2 may be denoted a mid cluster CT2. The age difference of the existing representative feature vector may be defined as a range which is similar to the face vector by which the age for the user's face may be estimated or a range in which the face vector is expandable.

The processor may extract face vectors V4 to V11 from the face feature. The processor may add the added face vector to the reference cluster CT1, thereby configuring the mid cluster CT2 which is the first threshold CT2. For example, the mid cluster CT2 may be configured based on the face vector and face information captured when the user has a teen's face.

Where the age difference of the existing representative feature vector falls out of the first threshold CT2, the processor may extract the face feature vector from the face vector. Unless the age difference of the existing representative feature vector falls out of the first threshold CT2, the processor may recognize the face based on the extracted face vector or, because there is no need for extracting the face feature vector, terminate the process.

The processor may add a representative feature vector group (S450). The representative feature vector may be denoted a face feature vector. The processor may store the extracted face feature vector and add the same to the mid cluster.

The processor may compare the existing representative feature vector and age difference with a second threshold (S460). The second threshold CT3 may be denoted an expanded cluster CT3.

The processor may extract face feature vectors V12 to V21 from the face vector. The processor may add the added face feature vector to the mid cluster CT2, thereby configuring the expanded cluster CT3 which is the second threshold CT3. For example, the expanded cluster CT2 may be configured based on the face feature vector, face vector, and face information captured when the user has an adult's face.

Where the age difference of the existing representative feature vector falls out of the second threshold CT3, the processor may recognize as another person's face, not the user's face. Unless the age difference of the existing representative feature vector falls out of the second threshold CT3, the processor may determine that the range is a range in which the face is recognizable based on the extracted face feature vector. The processor may thus generate a face image for age interpolation (S470).

The processor may recognize that the user's face varied depending on ages is the same by generating the face image for age interpolation. The processor may classify the reference cluster, mid cluster, and expanded cluster as the same cluster, thereby recognizing that the user is the same person although the user's face is varied over time.

Figure 17:
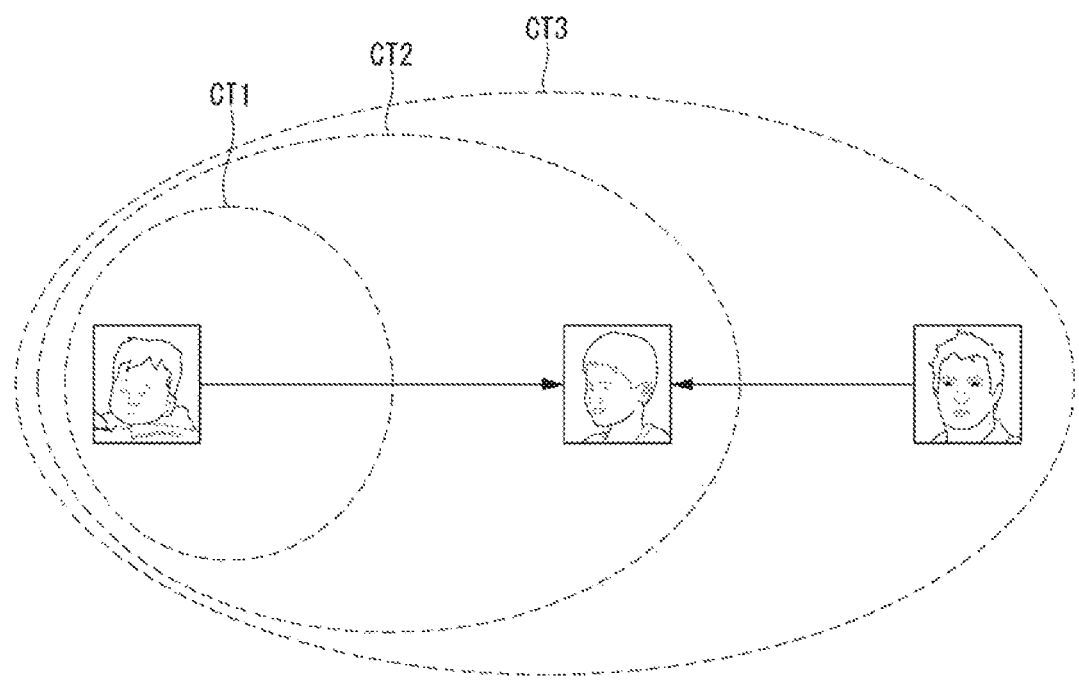
FIG. 17 is a view illustrating an example of configuring a cluster according to an embodiment of the disclosure.

FIG. 17 is a view illustrating an example of configuring a cluster according to an embodiment of the disclosure.

The description made above in connection with FIGS. 15 and 16 focuses primarily on an embodiment in which the processor recognizes the user's face varied over time according to an embodiment. Unlike this, in connection with FIG. 17, an embodiment is described in which the processor recognizes the user's teen face using the user's infant face and the user's adult face according to an embodiment.

The processor may extract infant face features from infant face information captured when the user has an infant face. The processor may configure an infant cluster CT1 based on pre-stored infant face information based on the infant face.

The processor may obtain an infant face vector from the infant face feature extracted from the infant face information and select an infant face feature vector based on the obtained infant face vector.

The processor may extract adult face features from adult face information captured when the user has an adult face. The processor may configure an adult cluster CT3 based on pre-stored adult face information based on the adult face.

The processor may obtain an adult face vector from the adult face feature extracted from the adult face information and select an adult face feature vector based on the obtained adult face vector. Further, the processor may add the adult face feature vector by the user's labeling.

The infant face feature vector and the adult face feature vector may be vectors in different directions. For example, if the infant face feature vector is assumed to be in a first direction along which time passes, the adult face feature vector may be a second direction which is opposite to the first direction.

The processor may extract feature values from the infant face feature vector and adult face feature vector. The feature vector may specifically indicate information by which a teen face, which is a middle between the infant face and the adult face, may be configured.

The processor may generate an image for the teen face by inputting the feature values to an ANN classifier trained to configure the teen face.

The processor may configure the teen cluster CT2 by obtaining teen face information, teen face characteristics, teen face vector, and teen face feature vector based on the generated teen face image.

As described above, the processor may predict the age variation state for the user's face based on the infant cluster and adult cluster and generate the teen cluster.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for recognizing a user's face using an intelligent electronic device, the method comprising:
   obtaining a face area from the user's face captured and obtaining face information from the face area;
   obtaining a face feature based on the face information;
   comparing the obtained face feature with a default cluster;
   selecting whether to extract a face vector from the face feature based on a result of the comparison;
   determining an age variation state for the user's face based on the extracted face vector; and
   upon determining that the face vector is in the age variation state for the user's face, extracting a face feature vector from the face vector and configuring an expanded cluster by adding the face feature vector to the default cluster,
   wherein the determining the age variation state includes:
      extracting feature values from the face vector;
      inputting the feature values to an artificial neural network (ANN) classifier to identify the age variation state; and
      determining the age variation state from the artificial neural network, and
   wherein the feature values are values by which the age variation state is identified.

2. The method of claim 1, wherein the face information includes position information for the user's eye, nose, mouth, eyebrow, forehead, chin, and ear, ratio information for an interval of the user's eye, nose, mouth, eyebrow, forehead, chin, and ear, and shape information for the user's eye, nose, mouth, eyebrow, forehead, chin, and ear.

3. The method of claim 1, wherein the default cluster is configured based on the face feature extracted from position information for the user's eye, nose, mouth, eyebrow, forehead, chin, and ear, ratio information for an interval of the user's eye, nose, mouth, eyebrow, forehead, chin, and ear, and shape information for the user's eye, nose, mouth, eyebrow, forehead, chin, and ear.

4. The method of claim 1, wherein comparing the obtained face information with the default cluster includes:
   recognizing or terminating the user's face when the face information is within the default cluster; and
   extracting the face vector from the face information when the face information is out of the default cluster.

5. The method of claim 1, further comprising:
   configuring the expanded cluster includes generating a face image for interpolation based on the face feature vector.

6. The method of claim 1, wherein configuring the expanded cluster includes generating a mid cluster by predicting the age variation state for the user's face based on the default cluster and the expanded cluster.

7. The method of claim 1, further comprising receiving, from a network, downlink control information (DCI) used for scheduling transmission of the obtained face information, and
   wherein the face information is transmitted to the network based on the DCI.

8. The method of claim 7, further comprising performing an initial access procedure with the network based on a synchronization signal block (SSB),
   wherein the face information is transmitted to the network via a physical uplink shared channel (PUSCH), and
   wherein demodulation-reference signals (DM-RSs) of the SSB and the PUSCH are quasi co-located (QCL) for QCL type D.

9. The method of claim 7, further comprising:
   controlling a transceiver to transmit the face information to an artificial intelligence (AI) processor included in the network; and
   controlling the transceiver to receive AI-processed information from the AI processor,
   wherein the AI-processed information includes information resultant from determining the age variation state.

10. An intelligent electronic device, comprising:
    a camera; and
    a processor receiving a user's face captured by the camera,
    wherein the processor:
       obtains a face area from the user's face, obtains face information from the face area, obtain a face feature based on the face information, compares the obtained face feature with a preconfigured default cluster, and selects whether to extract a face vector from the face feature based on a result of the comparison; and
       determines an age variation state for the user's face based on the extracted face vector and, upon determining that the face vector is in the age variation state for the user's face, and configures an expanded cluster by adding a face feature vector to the default cluster,
    wherein the determining of the age variation state by the processor includes:
       extracting feature values from the face vector;
       inputting the feature values to an artificial neural network (ANN) classifier to identify the age variation state; and
       determining the age variation state from the artificial neural network, and
    wherein the feature values are values by which the age variation state is identified.

11. The intelligent electronic device of claim 10, wherein the face information includes position information for the user's eye, nose, mouth, eyebrow, forehead, chin, and ear, ratio information for an interval of the user's eye, nose, mouth, eyebrow, forehead, chin, and ear, and shape information for the user's eye, nose, mouth, eyebrow, forehead, chin, and ear.

12. The intelligent electronic device of claim 10, wherein the default cluster is configured based on the face feature extracted from position information for the user's eye, nose, mouth, eyebrow, forehead, chin, and ear, ratio information for an interval of the user's eye, nose, mouth, eyebrow, forehead, chin, and ear, and shape information for the user's eye, nose, mouth, eyebrow, forehead, chin, and ear.

13. The intelligent electronic device of claim 10, wherein the processor:
    recognizes or terminates the user's face when the face information is within the default cluster; and
    extracts the face vector from the face information when the face information is out of the default cluster.

14. The intelligent electronic device of claim 10, wherein the processor generates a face image for interpolation based on the face feature vector.

15. The intelligent electronic device of claim 10, wherein the processor generates a mid cluster by predicting the age variation state for the user's face based on the default cluster and the expanded cluster.

16. The intelligent electronic device of claim 10, further comprising a transceiver, wherein the processor receives, from a network via the transceiver, downlink control information (DCI) used for scheduling transmission of the obtained face information, and wherein the face information is transmitted to the network via the transceiver based on the DCI.

17. The intelligent electronic device of claim 16, wherein the processor performs an initial access procedure with the network based on a synchronization signal block (SSB) via the transceiver, wherein the face information is transmitted to the network via a physical uplink shared channel (PUSCH), and wherein demodulation-reference signals (DM-RSs) of the SSB and the PUSCH are quasi co-located (QCL) for QCL type D.

18. The intelligent electronic device of claim 16, wherein the processor:

controls the transceiver to transmit the face information to an artificial intelligence (AI) processor included in the network; and controls the transceiver to receive AI-processed information from the AI processor, and wherein the AI-processed information includes information resultant from determining the age variation state.

* * * * *